United States Patent
Seki et al.

(10) Patent No.: US 9,644,346 B2
(45) Date of Patent: May 9, 2017

(54) CALIBRATION SYSTEM AND CALIBRATION METHOD FOR EXCAVATOR

(71) Applicant: Komatsu Ltd., Tokyo (JP)

(72) Inventors: Masanobu Seki, Fujisawa (JP); Masashi Ichihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/389,571

(22) PCT Filed: May 14, 2014

(86) PCT No.: PCT/JP2014/062894
§ 371 (c)(1),
(2) Date: Sep. 30, 2014

(87) PCT Pub. No.: WO2015/173920
PCT Pub. Date: Nov. 19, 2015

(65) Prior Publication Data
US 2015/0330060 A1 Nov. 19, 2015

(51) Int. Cl.
*E02F 9/26* (2006.01)
*G01B 21/04* (2006.01)
(Continued)

(52) U.S. Cl.
CPC ........... *E02F 9/264* (2013.01); *E02F 3/32* (2013.01); *E02F 3/435* (2013.01); *G01B 21/042* (2013.01);
(Continued)

(58) Field of Classification Search
CPC ..... E02F 3/32; E02F 3/435; E02F 9/26; E02F 9/264; E02F 9/265; G01B 21/042
(Continued)

(56) References Cited

U.S. PATENT DOCUMENTS

| 6,691,437 | B1 * | 2/2004 | Yost | E02F 3/435 356/141.2 |
| 7,856,727 | B2 * | 12/2010 | Chiorean | E02F 9/265 33/1 N |

(Continued)

FOREIGN PATENT DOCUMENTS

| CN | 101652679 A | 2/2010 |
| CN | 103080426 A | 5/2013 |

(Continued)

OTHER PUBLICATIONS

Wikipedia article, "Total station", Old revision dated May 9, 2014, 5 pages.*

(Continued)

*Primary Examiner* — Behrang Badii
*Assistant Examiner* — David Testardi
(74) *Attorney, Agent, or Firm* — Locke Lord LLP

(57) ABSTRACT

A calibration system for an excavator includes the excavator having an upper structure swingably attached to a chassis, a working machine having a boom, an arm, and a working tool, and a current position computation unit configured to compute a current position of a working point of the working tool; a calibration device configured to calibrate parameters based on parameters indicating dimensions and rotation angles of the boom, the arm, and the working tool; an external measurement device that measures a position of the working point; and an inclination information detection device that detects inclination information of the excavator in an anteroposterior direction. The calibration device corrects positions of the working point measured by the external measurement device, based on the inclination information of the excavator in the anteroposterior direction, and computes calibrated values of the parameters based on coordinates of the working point at corrected positions.

7 Claims, 19 Drawing Sheets

(51) Int. Cl.
*E02F 3/32* (2006.01)
*E02F 3/43* (2006.01)
*G01S 19/14* (2010.01)
*G01S 19/40* (2010.01)
*G01S 19/43* (2010.01)

(52) U.S. Cl.
CPC .............. *G01S 19/14* (2013.01); *G01S 19/40* (2013.01); *G01S 19/43* (2013.01)

(58) Field of Classification Search
USPC ............................................... 701/33.1, 34.4
See application file for complete search history.

(56) References Cited

U.S. PATENT DOCUMENTS

| | | | |
|---|---|---|---|
| 8,145,394 B2* | 3/2012 | Chiorean | E02F 3/435 |
| | | | 701/33.1 |
| 8,183,867 B2 | 5/2012 | Fling et al. | |
| 8,838,329 B2 | 9/2014 | Seki | |
| 9,020,693 B2 | 4/2015 | Seki | |
| 9,157,216 B2 | 10/2015 | Seki | |
| 2010/0096148 A1 | 4/2010 | Chiorean et al. | |
| 2010/0207633 A1 | 8/2010 | Fling et al. | |
| 2013/0158784 A1* | 6/2013 | Fukano | E02F 9/2033 |
| | | | 701/34.4 |
| 2013/0158785 A1* | 6/2013 | Fukano | E02F 9/261 |
| | | | 701/34.4 |
| 2013/0158786 A1* | 6/2013 | Fukano | E02F 9/264 |
| | | | 701/34.4 |
| 2013/0158787 A1* | 6/2013 | Nomura | E02F 9/26 |
| | | | 701/34.4 |
| 2013/0158788 A1 | 6/2013 | Seki | |
| 2013/0158789 A1 | 6/2013 | Seki | |
| 2013/0158797 A1* | 6/2013 | Fukano | E02F 9/264 |
| | | | 701/36 |
| 2013/0166143 A1* | 6/2013 | Seki | E02F 9/264 |
| | | | 701/34.4 |
| 2014/0107897 A1* | 4/2014 | Zhu | E02F 3/435 |
| | | | 701/50 |

FOREIGN PATENT DOCUMENTS

| | | |
|---|---|---|
| CN | 103080427 A | 5/2013 |
| CN | 103097614 A | 5/2013 |
| JP | 2002-181538 A | 6/2002 |
| JP | 2006-265954 A | 10/2006 |
| JP | 2012-233353 A | 11/2012 |
| WO | WO-2012/128192 A1 | 9/2012 |
| WO | WO 2012/128199 A1 * | 9/2012 |
| WO | WO-2012/128200 A1 | 9/2012 |

OTHER PUBLICATIONS

International Search Report mailed Aug. 19, 2014, issued for PCT/JP2014/062894.

* cited by examiner

FIG.4

| | No | ITEMS | SYMBOLS |
|---|---|---|---|
| WORKING MACHINE PARAMETERS | 1 | LENGTH BETWEEN BOOM PIN AND ARM PIN | L1 |
| | 2 | LENGTH BETWEEN ARM PIN AND BUCKET PIN | L2 |
| | 3 | LENGTH BETWEEN BUCKET PIN AND BLADE EDGE OF BUCKET | L3 |
| | 4 | DISTANCE BETWEEN BOOM CYLINDER TOP PIN AND BOOM PIN | Lboom1 |
| | 5 | DISTANCE BETWEEN BOOM CYLINDER TOP PIN AND BOOM PIN IN xboom-AXIS DIRECTION | Lboom1_x |
| | 6 | DISTANCE BETWEEN BOOM CYLINDER TOP PIN AND BOOM PIN IN zboom-AXIS DIRECTION | Lboom1_z |
| | 7 | DISTANCE BETWEEN BOOM CYLINDER FOOT PIN AND BOOM PIN | Lboom2 |
| | 8 | DISTANCE BETWEEN BOOM CYLINDER FOOT PIN AND BOOM PIN IN VEHICLE BODY HORIZONTAL DIRECTION | Lboom2_x |
| | 9 | DISTANCE BETWEEN BOOM CYLINDER FOOT PIN AND BOOM PIN IN VEHICLE BODY VERTICAL DIRECTION | Lboom2_z |
| | 10 | DISTANCE BETWEEN ARM CYLINDER FOOT PIN AND ARM PIN | Lboom3 |
| | 11 | DISTANCE BETWEEN ARM CYLINDER FOOT PIN AND ARM PIN IN xboom-AXIS DIRECTION | Lboom3_x |
| | 12 | DISTANCE BETWEEN ARM CYLINDER FOOT PIN AND ARM PIN IN zboom-AXIS DIRECTION | Lboom3_z |
| | 13 | DISTANCE BETWEEN ARM PIN AND BUCKET PIN IN xarm2-AXIS DIRECTION | Larm1_x |
| | 14 | DISTANCE BETWEEN ARM PIN AND BUCKET PIN IN zarm2-AXIS DIRECTION | Larm1_z |
| | 15 | DISTANCE BETWEEN ARM CYLINDER TOP PIN AND ARM PIN | Larm2 |
| | 16 | DISTANCE BETWEEN ARM CYLINDER TOP PIN AND ARM PIN IN xarm2-AXIS DIRECTION | Larm2_x |
| | 17 | DISTANCE BETWEEN ARM CYLINDER TOP PIN AND ARM PIN IN zarm2-AXIS DIRECTION | Larm2_z |
| | 18 | DISTANCE BETWEEN BUCKET CYLINDER FOOT PIN AND FIRST LINK PIN | Larm3 |
| | 19 | DISTANCE BETWEEN BUCKET CYLINDER FOOT PIN AND FIRST LINK PIN IN xarm2-AXIS DIRECTION | Larm3_x1 |
| | 20 | DISTANCE BETWEEN BUCKET CYLINDER FOOT PIN AND FIRST LINK PIN IN zarm2-AXIS DIRECTION | Larm3_z1 |
| | 21 | DISTANCE BETWEEN FIRST LINK PIN AND BUCKET PIN IN xarm2-AXIS DIRECTION | Larm3_x2 |
| | 22 | DISTANCE BETWEEN FIRST LINK PIN AND BUCKET PIN IN zarm2-AXIS DIRECTION | Larm3_z2 |
| | 23 | DISTANCE BETWEEN FIRST LINK PIN AND BUCKET PIN | Larm4 |
| | 24 | DISTANCE BETWEEN BUCKET CYLINDER TOP PIN AND FIRST LINK PIN | Lbucket1 |
| | 25 | DISTANCE BETWEEN BUCKET CYLINDER TOP PIN AND SECOND LINK PIN | Lbucket2 |
| | 26 | DISTANCE BETWEEN BUCKET PIN AND SECOND LINK PIN | Lbucket3 |
| | 27 | BOOM CYLINDER OFFSET | boft |
| | 28 | ARM CYLINDER OFFSET | aoft |
| | 29 | BUCKET CYLINDER OFFSET | bkoft |
| | 30 | DISTANCE BETWEEN BUCKET PIN AND SECOND LINK PIN IN xbucket-AXIS DIRECTION | Lbucket4_x |
| | 31 | DISTANCE BETWEEN BUCKET PIN AND SECOND LINK PIN IN zbucket-AXIS DIRECTION | Lbucket4_z |
| ANTENNA PARAMETERS | 32 | DISTANCE BETWEEN BOOM PIN AND REFERENCE ANTENNA IN x-AXIS DIRECTION OF VEHICLE BODY COORDINATE SYSTEM | Lbbx |
| | 33 | DISTANCE BETWEEN BOOM PIN AND REFERENCE ANTENNA IN y-AXIS DIRECTION OF VEHICLE BODY COORDINATE SYSTEM | Lbby |
| | 34 | DISTANCE BETWEEN BOOM PIN AND REFERENCE ANTENNA IN z-AXIS DIRECTION OF VEHICLE BODY COORDINATE SYSTEM | Lbbz |
| | 35 | DISTANCE BETWEEN BOOM PIN AND DIRECTIVE ANTENNA IN x-AXIS DIRECTION OF VEHICLE BODY COORDINATE SYSTEM | Lbdx |
| | 36 | DISTANCE BETWEEN BOOM PIN AND DIRECTIVE ANTENNA IN y-AXIS DIRECTION OF VEHICLE BODY COORDINATE SYSTEM | Lbdy |
| | 37 | DISTANCE BETWEEN BOOM PIN AND DIRECTIVE ANTENNA IN z-AXIS DIRECTION OF VEHICLE BODY COORDINATE SYSTEM | Lbdz |

CALIBRATION SYSTEM AND CALIBRATION METHOD FOR EXCAVATOR

FIELD

The present invention relates to a calibration system and calibration method for an excavator.

BACKGROUND

There is known an excavator including a position detection device to detect the current position of a working point of a working machine. For example, at the excavator disclosed in Patent Literature 1, the position coordinates of a blade edge of a bucket are computed based on position information from GPS antennas. Specifically, the position coordinates of the blade edge of the bucket are computed based on parameters such as positional relationship between the GPS antennas and a boom pin, respective lengths of a boom, an arm, and a bucket, respective direction angles of the boom, the arm, and the bucket, and others.

CITATION LIST

Patent Literature

Patent Literature 1: Japanese Patent Application Laid-open No. 2002-181538

SUMMARY

Technical Problem

The accuracy of the computed position coordinates of the blade edge of the bucket is subject to influence by the accuracy of the foregoing parameters. Thus, on initial setting of the position detection device for the excavator, the parameters for the working machine included in the excavator are calibrated such that measured values of the position coordinates coincide with calculated values of the position coordinates. For example, there is a method by which to measure the positions (working points) of a working tool by an external measurement device, and calibrate the parameters related to the dimensions and the like of the working machine based on the measurement values. At that time, the excavator may be inclined under the weight of the working machine. Thus, the working points measured by the external measurement device may be different from the original positions of the working points, which may lead to deterioration of the accuracy of calibration of the parameters.

An object of the present invention is to control the deterioration of the accuracy of calibrating parameters of a working machine included in an excavator.

Solution to Problem

According to an aspect of the present invention, a calibration system for an excavator, includes the excavator that includes a chassis, an upper structure that is swingably attached to the chassis, a working machine that includes a boom rotatably attached to the upper structure, an arm rotatably attached to the boom, and a working tool rotatably attached to the arm, and a current position computation unit that computes a current position of a working point included in the working tool, based on a plurality of parameters indicating dimensions of the boom, the arm, and the working tool, a rotation angle of the boom with respect to the upper structure, a rotation angle of the arm with respect to the boom, and a rotation angle of the working tool with respect to the arm; a calibration device configured to calibrate the parameters; an external measurement device that measures a position of the working point; and an inclination information detection device that detects inclination information of the excavator in an anteroposterior direction of a vehicle body.

The calibration device corrects a plurality of positions of the working point measured by the external measurement device, based on the inclination information of the excavator in the anteroposterior direction of the vehicle body detected by the inclination information detection device, and computes calibrated values of the parameters based on coordinates of the working point at the plurality of corrected positions.

According to another aspect of the present invention, a calibration system for an excavator, includes the excavator that includes a chassis, an upper structure that is swingably attached to the chassis, a working machine that includes a boom rotatably attached to the upper structure, an arm rotatably attached to the boom, and a working tool rotatably attached to the arm, an angle detection unit that detects a rotation angle of the boom with respect to the upper structure, a rotation angle of the arm with respect to the boom and a rotation angle of the working tool with respect to the arm, and a current position computation unit that computes a current position of a working point included in the working tool, based on a plurality of parameters indicating dimensions and the rotation angles of the boom, the arm, and the working tool; a calibration device configured to calibrate the parameters; an external measurement device that measures a position of the working point; and an inclination information detection device that detects inclination information of the excavator in an anteroposterior direction of a vehicle body.

The calibration device includes an input unit into which working machine position information including at least three positions of the working point different in posture of the working machine measured by the external measurement device, upper structure position information including at least three positions of the working point different in swing angle of the upper structure with respect to the chassis, and inclination information of the excavator in the anteroposterior direction of the vehicle body corresponding to the positions of the working point included in the working machine position information, detected by the inclination information detection device, are input; a correction unit that corrects the positions of the working point included in the working machine position information based on the inclination information; a vehicle-body-coordinate-system computation unit that computes a first unit-normal vector vertical to an operation plane of the working machine based on the working machine position information including the corrected positions of the working point, computes a second unit-normal vector vertical to a swing plane of the upper structure based on the upper structure position information, and computes a third unit-normal vector vertical to the first unit-normal vector and the second unit-normal vector; a coordinate conversion unit that converts coordinates of the working point at the plurality of positions measured by the external measurement device, from a coordinate system at the external measurement device to a vehicle body coordinate system at the excavator, using the first unit normal vector, the second unit-normal vector, and the third unit-normal vector; and a calibration computation unit that computes calibrated values of the parameters based on the coordinates of the working point at the plurality of positions converted into the vehicle body coordinate system.

According to another aspect of the present invention, the inclination information is a pitch angle of the excavator.

It is preferable that the vehicle-body-coordinate-system computation unit computes an intersection vector of the operation plane of the working machine and the swing plane of the upper structure, and computes a unit normal vector of a plane that passes through the intersection vector of the operation plane of the working machine and the swing plane and is perpendicular to the operation plane of the working machine, as the second unit-normal vector.

It is preferable that the working machine position information includes at least one of the position of the working machine in the vertical direction and the plurality of positions of the working machine different in the anteroposterior direction of the vehicle body.

It is preferable that the parameters include: a first distance between center of rotation of the boom with respect to the upper structure and center of rotation of the arm with respect to the boom; a second distance between center of rotation of the arm with respect to the boom and center of rotation of the working tool with respect to the arm; and a third distance between center of rotation of the working tool with respect to the arm and the working point, the current position computation unit computes the current position of the working point in the vehicle body coordinate system, based on the first distance, the second distance, the third distance, and the rotation angles, and the calibration computation unit computes calibrated values of the parameters for computing the first distance, the second distance, the third distance, and the rotation angles, based on the coordinates of the working point at the plurality of positions measured by the external measurement device and converted into the vehicle body coordinate system.

It is preferable that the external measurement device is a total station.

According to another aspect of the present invention, a calibration method for an excavator that includes a chassis, an upper structure that is swingably attached to the chassis, and a working machine that includes a boom rotatably attached to the upper structure, an arm rotatably attached to the boom, and a working tool rotatably attached to the arm, the method being for calibrating a plurality of parameters indicating dimensions and the rotation angles of the boom, the arm, and the working tool, includes steps of acquiring inclination information of the excavator in an anteroposterior direction of a vehicle body; correcting the plurality of positions of the working point included in the working tool based on the inclination information; and computing calibrated values of the parameters based on coordinates of the working point at the plurality of corrected positions.

According to another aspect of the present invention, a calibration method for an excavator that includes a chassis, an upper structure that is swingably attached to the chassis, and a working machine that includes a boom rotatably attached to the upper structure, an arm rotatably attached to the boom, and a working tool rotatably attached to the arm, the method being for calibrating a plurality of parameters indicating dimensions and the rotation angles of the boom, the arm, and the working tool, includes steps of acquiring working machine position information including at least two positions of the working point different in posture of the working machine and a position of a predetermined reference point on an operation plane of the working machine or including at least three positions of the working point included in the working tool, different in posture of the working machine; upper structure position information including at least three positions of the working point different in swing angle of the upper structure with respect to the chassis, and inclination information of the excavator in an anteroposterior direction of a vehicle body corresponding to the positions of the working point included in the working machine position information; correcting the positions of the working point included in the working machine position information based on the inclination information; computing a first unit-normal vector vertical to the operation plane of the working machine based on the working machine position information including the corrected positions of the working point, computing a second unit-normal vector vertical to a swing plane of the upper structure based on the upper structure position information, and computing a third unit-normal vector vertical to the first unit-normal vector and the second unit-normal vector; converting coordinates of the working point at the plurality of positions, from a coordinate system at the external measurement device to a vehicle body coordinate system at the excavator, using the first unit-normal vector, the second unit-normal vector, and the third unit-normal vector; and computing calibrated values of the parameters based on the coordinates of the working point at the plurality of positions converted into the vehicle body coordinate system.

According to the present invention, it is possible to control the deterioration of the accuracy of calibrating the parameters for the working machine included in the excavator.

BRIEF DESCRIPTION OF DRAWINGS

FIG. 4 is a diagram providing a list of parameters necessary for computing a position of a blade edge.

DESCRIPTION OF EMBODIMENTS

Mode for carrying out the present invention, hereinafter, referred to as embodiment, will be described in detail with reference to the drawings.

<Entire Configuration of Excavator>

Figure 1:
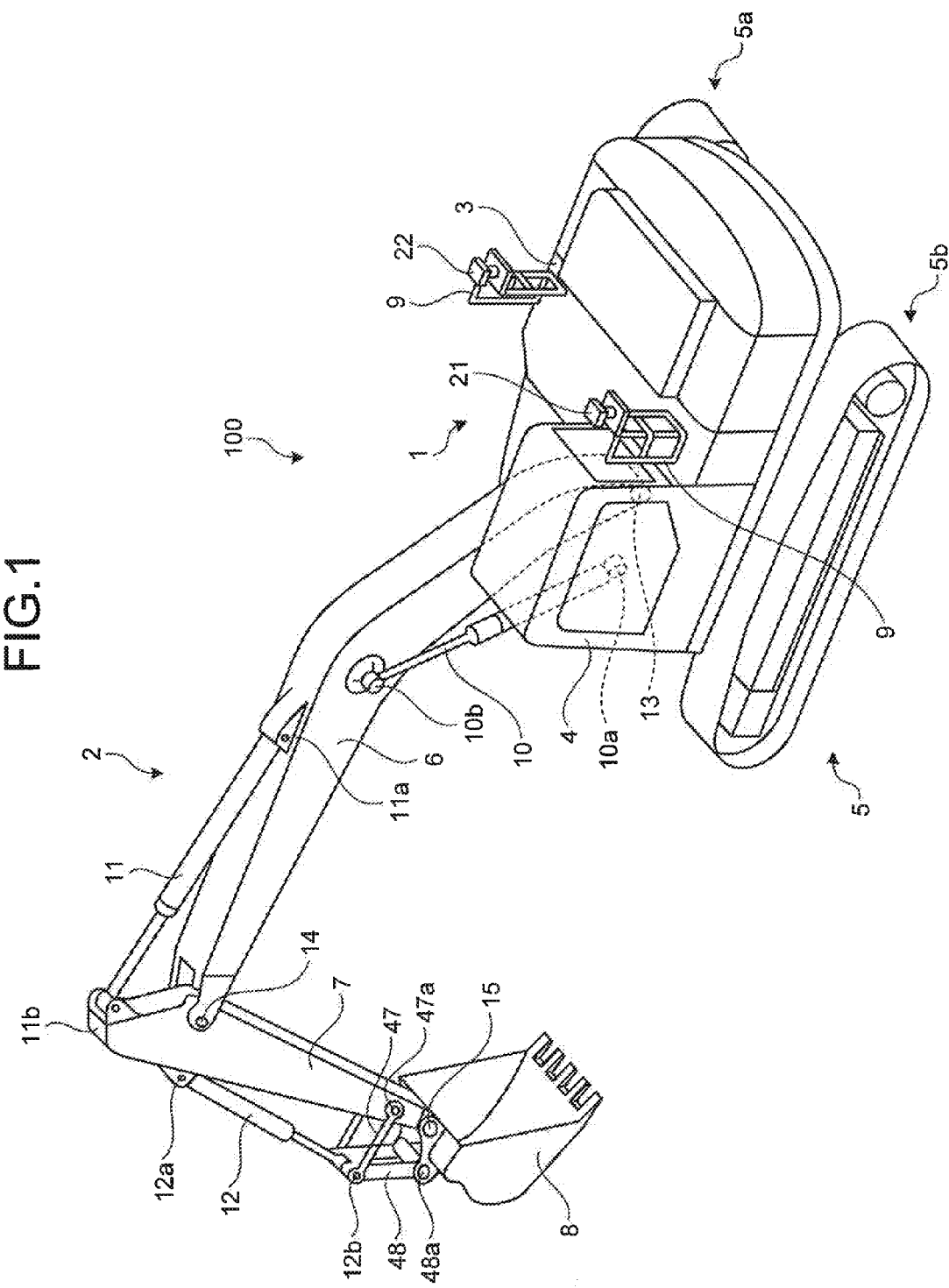
FIG. 1 is a perspective view of an excavator to be calibrated by a calibration system according to an embodiment.
Figure 2A:
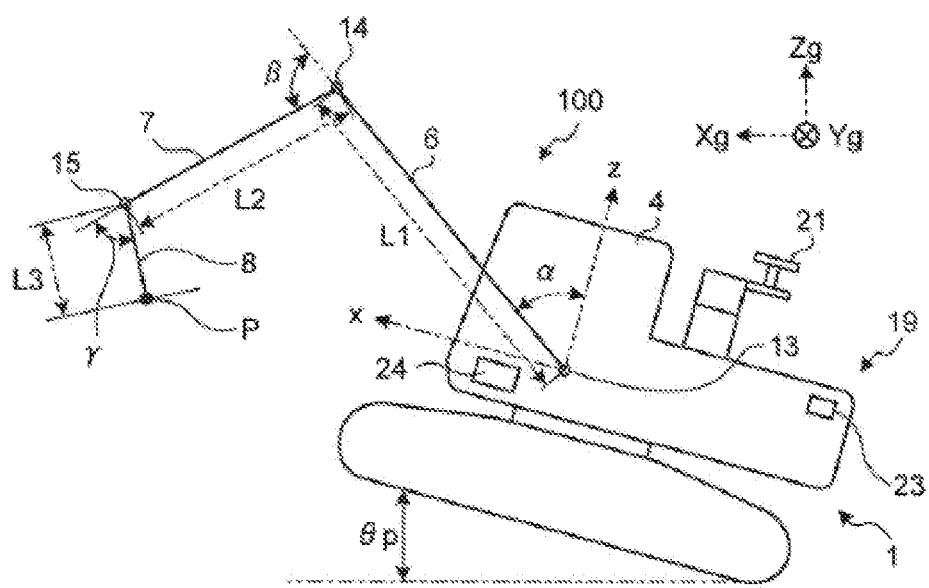
FIG. 2A is a side view of the excavator.
Figure 2B:
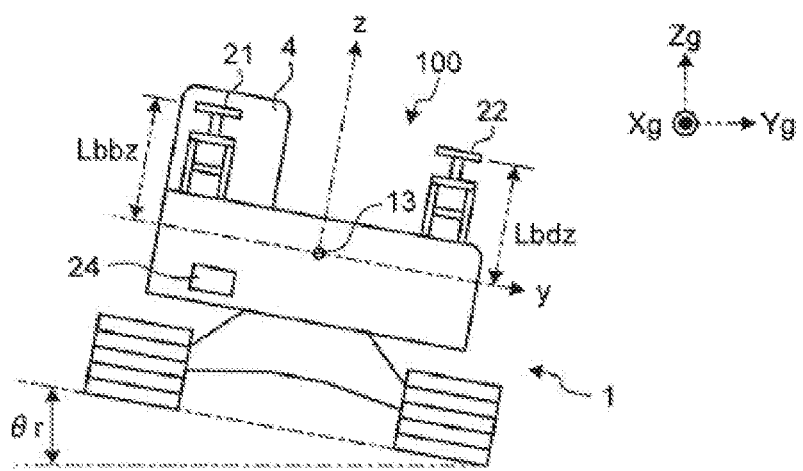
FIG. 2B is a rear view of the excavator.
Figure 2C:
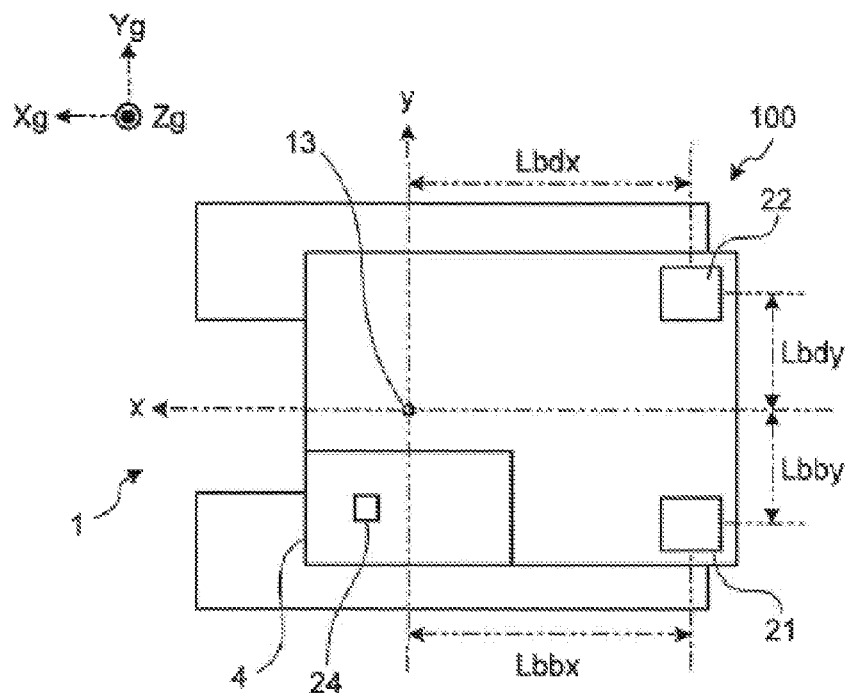
FIG. 2C is a top view of the excavator.
Figure 3:
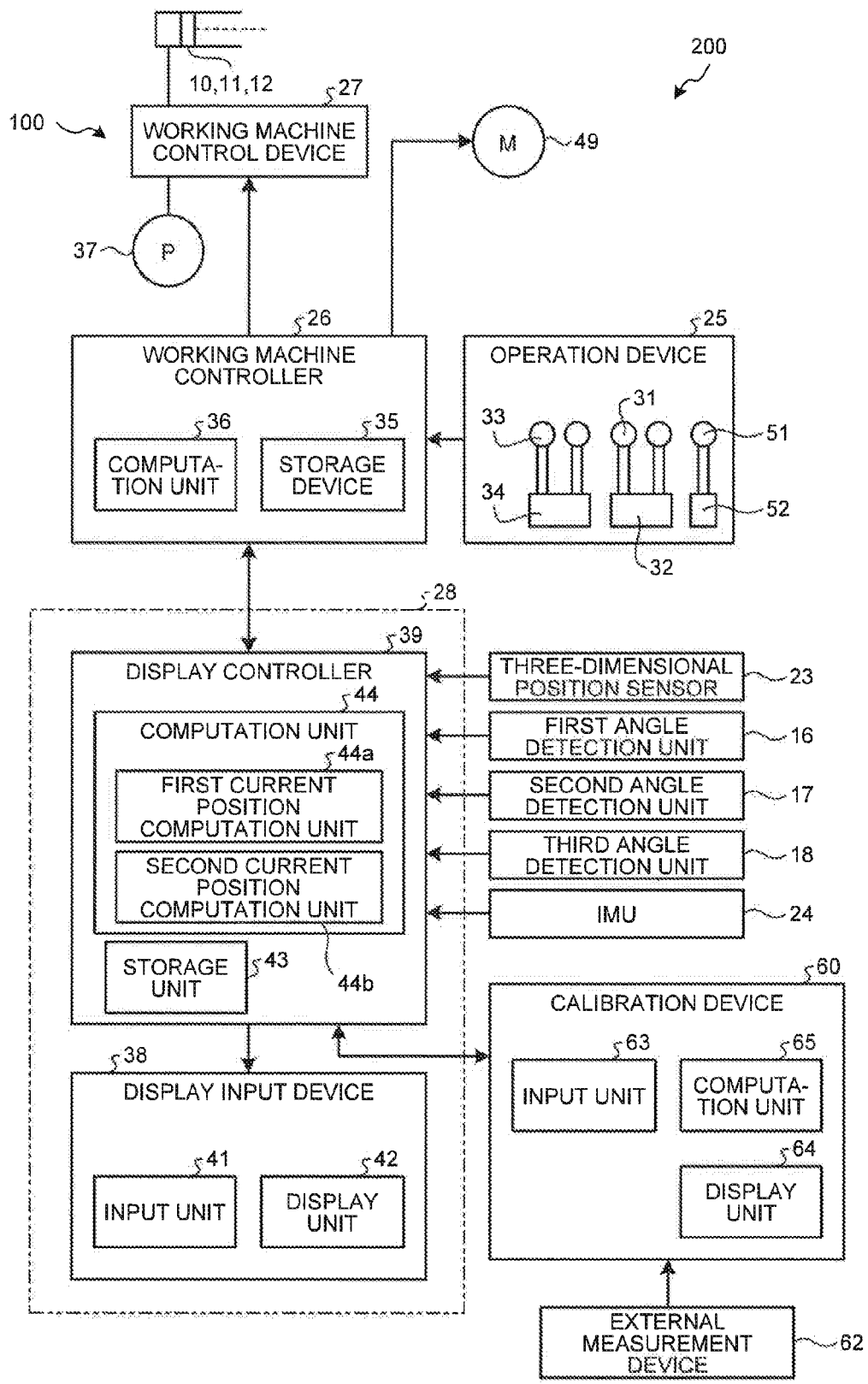
FIG. 3 is a block diagram of a configuration of a control system included in the excavator and a calibration system for the excavator according to the embodiment.

FIG. 1 is a perspective view of an excavator 100 to be calibrated by a calibration system according to an embodiment. FIG. 2A is a side view of the excavator 100. FIG. 2B is a rear view of the excavator 100. FIG. 2C is a top view of the excavator 100. FIG. 3 is a block diagram of a configuration of a control system included in the excavator 100 and a calibration system 200 for the excavator 100 according to the embodiment.

The excavator 100 has a vehicle body 1 and a working machine 2. The vehicle body 1 has an upper structure 3, a cab 4, and a chassis 5. The upper structure 3 is swingably attached to the chassis 5. The upper structure 3 houses a hydraulic pump 37 (refer to FIG. 3) and devices such as an engine not illustrated. Hand rails 9 are attached to a top of the upper structure 3. The cab 4 is placed at the front of the upper structure 3. A display input device 38 and an operation device 25 described later are arranged within the cab 4 (refer to FIG. 3). The chassis 5 is a crawler type and has track assemblies 5a and 5b. The excavator 100 travels by rotating the track assemblies 5a and 5b.

The working machine 2 is attached to the front part of the vehicle body 1, and has a boom 6, an arm 7, a bucket 8 as a working tool, a boom cylinder 10, an arm cylinder 11, and a bucket cylinder 12. A base end part of the boom 6 is rotatably attached to the front part of the vehicle body 1 via a boom pin 13. That is, the boom pin 13 is equivalent to center of rotation of the boom 6 with respect to the upper structure 3. A base end part of the arm 7 is rotatably attached to a tip end part of the boom 6 via an arm pin 14. That is, the arm pin 14 is equivalent to center of rotation of the arm 7 with respect to the boom 6. The bucket 8 is rotatably attached to a tip end part of the arm 7 via a bucket pin 15. That is, the bucket pin 15 is equivalent to center of rotation of the bucket 8 with respect to the arm 7.

As illustrated in FIG. 2A, a length of the boom 6, that is, a distance between the boom pin 13 and the arm pin 14 is designated as L1, which is equivalent to a first distance in the embodiment. A length of the arm 7, that is, a distance between the arm pin 14 and the bucket pin 15 is designated as L2, which is equivalent to a second distance in the embodiment. A length of the bucket 8, that is, a distance between the bucket pin 15 and a blade edge P of the bucket 8 is designated as L3, which is equivalent to a third distance in the embodiment.

The boom cylinder 10, the arm cylinder 11, and the bucket cylinder 12 illustrated in FIG. 1 are hydraulic cylinders driven by hydraulic pressure. A base end part of the boom cylinder 10 is rotatably attached to the upper structure 3 via a boom cylinder foot pin 10a. A tip end part of the boom cylinder 10 is rotatably attached to the boom 6 via a boom cylinder top pin 10b. The boom cylinder is extended or contracted by hydraulic pressure to drive the boom 6.

A base end part of the arm cylinder 11 is rotatably attached to the boom 6 via an arm cylinder foot pin 11a. A tip end part of the arm cylinder 11 is rotatably attached to the arm 7 via an arm cylinder top pin 11b. The arm cylinder 11 is extended or contracted by hydraulic pressure to drive the arm 7.

A base end part of the bucket cylinder 12 is rotatably attached to the arm 7 via a bucket cylinder foot pin 12a. A tip end part of the bucket cylinder 12 is rotatably attached to one end of a first link member 47 and one end of a second link member 48 via a bucket cylinder top pin 12b. The other end of the first link member 47 is rotatably attached to the tip end part of the arm 7 via a first link pin 47a. The other end of the second link member 48 is rotatably attached to the bucket 8 via a second link pin 48a. The bucket cylinder 12 is extended or contracted by hydraulic pressure to drive the bucket 8.

As illustrated in FIG. 3, the boom 6, the arm 7, and the bucket 8 are provided with a first angle detection unit 16, a second angle detection unit 17, and a third angle detection unit 18, respectively. The first angle detection unit 16, the second angle detection unit 17, and the third angle detection unit 18 are stroke sensors, for example, which are configured to detect stroke lengths of the cylinders 10, 11, and 12, thereby to indirectly detect a rotation angle of the boom 6 with respect to the vehicle body 1, a rotation angle of the arm 7 with respect to the boom 6, and a rotation angle of the bucket 8 with respect to the arm 7.

Specifically, the first angle detection unit 16 detects a stroke length of the boom cylinder 10. A display controller 39 described later computes rotation angle $\alpha$ of the boom 6 with respect to z axis of the vehicle coordinate system illustrated in FIG. 2A, from the stroke length of the boom cylinder 10 detected by the first angle detection unit 16. The second angle detection unit 17 detects a stroke length of the arm cylinder 11. The display controller 39 computes rotation angle $\beta$ of the arm 7 with respect to the boom 6, from the stroke length of the arm cylinder 11 detected by the second angle detection unit 17. The third angle detection unit 18 detects a stroke length of the bucket cylinder 12. The display controller 39 computes rotation angle $\gamma$ of the bucket 8 with respect to the arm 7, from the stroke length of the bucket cylinder 12 detected by the third angle detection unit 18. The method for computing the rotation angles $\alpha$, $\beta$, and $\gamma$ will be described later in detail.

As illustrated in FIG. 2A, the vehicle body 1 includes a position detection unit 19. The position detection unit 19 detects the current position of the vehicle body 1 in the excavator 100. The position detection unit 19 has two antennas 21 and 22 for RTK-GNSS (Real Time Kinematic-Global Navigation Satellite Systems) illustrated in FIG. 1 and a three-dimensional position sensor 23 illustrated in FIG. 2A. The antennas 21 and 22 are attached to the hand rails 9 and are separated from each other by a predetermined distance along a y axis in a vehicle body coordinate system x-y-z described later (refer to FIG. 2C).

Signals according to GNSS radio waves received by the antennas 21 and 22 are input into the three-dimensional position sensor 23. The three-dimensional position sensor 23 detects the current positions of the antennas 21 and 22 in a global coordinate system Xg-Yg-Zg. The global coordinate system is a coordinate system measured by GNSS, and also a coordinate system which refers to an origin that is a stationary position on the earth. In contrast to this, a vehicle body coordinate system described later is a coordinate system with reference to an origin that is a stationary position on the vehicle body 1 (specifically, the upper structure 3). The antenna 21 (hereinafter, referred to as reference antenna 21) is intended to detect the current position of the vehicle body 1. The antenna 22 (hereinafter, referred to as directional antenna 22) is intended to detect the direction of the vehicle body 1, specifically, the direction of the upper structure 3. The position detection unit 19 detects directional angles of x axis and y axis in the vehicle coordinate system described later, in the global coordinate system, by the positions of the reference antenna 21 and the directional antenna 22. The antennas 21 and 22 may be GPS (Global Positioning System) antennas.

As illustrated in FIGS. 2A to 2C, the vehicle body 1 includes an IMU (Inertial Measurement Unit) 24. In the embodiment, the IMU 24 is installed at the lower part of the cab 4 as illustrated in FIGS. 2A and 2B. The IMU 24 detects acceleration acting on the excavator 100 and angular velocity. The IMU 24 detects an inclination angle $\theta r$ (hereinafter, referred to as roll angle $\theta r$) of the vehicle body 1 in a width direction with respect to the direction of gravitational force (vertical line), as illustrated in FIG. 2B.

In the embodiment, the width direction refers to width direction of the bucket 8, which agrees with a vehicle width direction. If the working machine 2 includes a tilt bucket as a working tool as described later, the width direction of the bucket 8 and the vehicle width direction may not agree with each other. The IMU 24 detects an inclination angle $\theta p$ (hereinafter, referred to as pitch angle $\theta p$ as appropriate) of the vehicle body 1 in the anteroposterior direction with respect to the direction of gravitational force, as illustrated in FIG. 2A. In the embodiment, the IMU 24 functions as an inclination information detection device to detect inclination information of the excavator 100 in the anteroposterior direction of the vehicle body. By using the IMU 24 as an inclination information detection device, it is possible to acquire information necessary for controlling the excavator 100 such as acceleration, angular velocity, and roll angle of the excavator 100, by one device. Instead of the IMU 24, a roll angle sensor and a pitch angle sensor may be prepared such that the former detects the roll angle $\theta r$ and the latter detects the pitch angle $\theta p$.

As illustrated in FIG. 3, the calibration system 200 for the excavator 100 includes the excavator 100 illustrated in FIG. 1, a calibration device 60, the external measurement device 62, and the IMU 24 as an inclination information detection device. The excavator 100 includes an operation device 25, a working machine controller 26, a working machine control device 27, and the hydraulic pump 37. The operation device 25 includes a working machine operation member 31, a working-machine-operation detection unit 32, a travelling operation member 33, a travelling operation detection unit 34, a swing operation member 51, and a swing operation detection unit 52.

The working machine operation member 31 is a member for an operator of the excavator 100 to operate the working machine 2, and is an operation lever, for example. The working-machine-operation detection unit 32 detects the contents of the operation by the working machine operation member 31, and sends the contents of the operation by the working machine operation member 31 detected as a detection signal to the working machine controller 26. The travelling operation member 33 is a member for the operator to operate travelling of the excavator 100, and is an operation lever, for example. The travelling operation detection unit 34 detects the contents of the operation by the travelling operation member 33, and sends the contents of the operation by the travelling operation member 33 detected as a detection signal to the working machine controller 26. The swing operation member 51 is a member for the operator to operate swinging of the upper structure 3, and is an operation lever, for example. The swing operation detection unit 52 detects the contents of the operation by the swing operation member 51 and sends the contents of the operation by the swing operation member 51 as a detection signal to the working machine controller 26.

The working machine controller 26 has a storage unit 35 such as a RAM and ROM and a computation unit 36 such as a CPU. The working machine controller 26 mainly controls operation of the working machine 2 and the swinging of the upper structure 3. The working machine controller 26 generates a control signal for operating the working machine 2 according to the operation of the working machine operation member 31, and outputs the control signal to the working machine control device 27. The working machine control device 27 has a hydraulic control device such as a proportional control valve. The working machine control device 27 controls flow rates of hydraulic oil supplied from the hydraulic pump 37 to the hydraulic cylinders 10, 11, and 12, based on the control signal from the working machine controller 26. The hydraulic cylinders 10, 11, and 12 are driven by the hydraulic oil supplied from the working machine control device 27. As a result, the working machine 2 is operated. In addition, the working machine controller 26 generates a control signal to swing the upper structure 3 corresponding to the operation of the swing operation member 51, and outputs the control signal to swing the upper structure to a swing motor 49. As a result, the swing motor 49 is driven and the upper structure 3 is swung.

<Configuration of Display System 28>

The excavator 100 is equipped with a display system 28. The display system 28 is a system to provide the operator with information for digging the ground in a working area and forming a shape as in a designed surface described later. The display system 28 has the display input device 38 and the display controller 39.

The display input device 38 has a touch panel-type input unit 41 and a display unit 42 such as an LCD. The display input device 38 displays a guide screen for providing information to dig. The guide screen displays various keys. The operator can touch various keys on the guide screen to execute various functions of the display system 28. The guide screen will be described later.

The display controller 39 realizes various functions of the display system 28. The display controller 39 and the working machine controller 26 can communicate with each other by wireless or wired communication means. The display controller 39 has a storage unit 43 such as a RAM and a ROM, and a computation unit 44 such as a CPU. The computation unit 44 executes various computations for displaying the guide screen, based on the various data stored in the storage unit 43 and results of detection by the position detection unit 19. Next, a method for computing the position of the blade edge of the bucket 8 described above will be described in detail.

<Method for Computing Position of Blade Edge>

FIG. 4 is a diagram illustrating a list of parameters necessary for computing the position of the blade edge. The computation unit 44 of the display controller 39 computes the current position of the blade edge of the bucket 8, based on results of detection by the position detection unit 19 and a plurality of parameters stored in the storage unit 43. The parameters include working machine parameters and antenna parameters. The working machine parameters include a plurality of parameters indicative of dimensions and rotation angles of the boom 6, the arm 7, and the bucket 8. The antenna parameters include a plurality of parameters indicative of position relationships between the antennas 21 and 22 and the boom 6.

As illustrated in FIG. 3, the computation unit 44 of the display controller 39 has a first-current-position computation unit 44a and a second-current-position computation unit 44b. The first-current-position computation unit 44a computes the current position of the blade edge of the bucket 8 in the vehicle body coordinate system, based on the working machine parameters. The second-current-position computation unit 44b computes the current position of the blade edge of the bucket 8 in the global coordinate system, from the antenna parameters, the current positions of the antennas 21 and 22 in the global coordinate system detected by the position detection unit 19, and the current position of the blade edge of the bucket 8 in the vehicle body coordinate system computed by the first-current-position computation unit 44a. Specifically, the current position of the blade edge of the bucket 8 is determined in such a manner as described below.

First, as illustrated in FIGS. 2A to 2C, the vehicle body coordinate system x-y-z with the origin defined by an intersection of the axis of the boom pin 13 and the operation plane of the working machine 2, which is described later, is set. In the following description, the position of the boom pin 13 refers to the position of a midpoint of the boom pin 13 in the vehicle width direction. From results of detection by the first angle detection unit 16, the second angle detection unit 17, and the third angle detection unit 18, the current rotation angles α, β, and γ of the boom 6, the arm 7, and the bucket 8 are computed. The method for computing the rotation angles α, β, and γ will be described later. The coordinates (x, y, z) of the blade edge of the bucket 8 in the vehicle body coordinate system are computed by the following Equation (1) using the rotation angles α, β, and γ of the boom 6, the arm 7, and the bucket 8, and the lengths L1, L2, and L3 of the boom 6, the arm 7, and the bucket 8.

$$x = L1 \sin\alpha + L2 \sin(\alpha+\beta) + L3 \sin(\alpha+\beta+\gamma)$$

$$y = 0$$

$$z = L1 \cos\alpha + L2 \cos(\alpha+\beta) + L3 \cos(\alpha+\beta+\gamma) \quad (1)$$

Next, the method for computing the current rotation angles α, β, and γ of the boom 6, the arm 7, and the bucket 8 from results of detection by the first angle detection unit 16, the second angle detection unit 17, and the third angle detection unit 18 will be described.

<Method for Computing Rotation Angles α, β, and γ>

Figure 5:
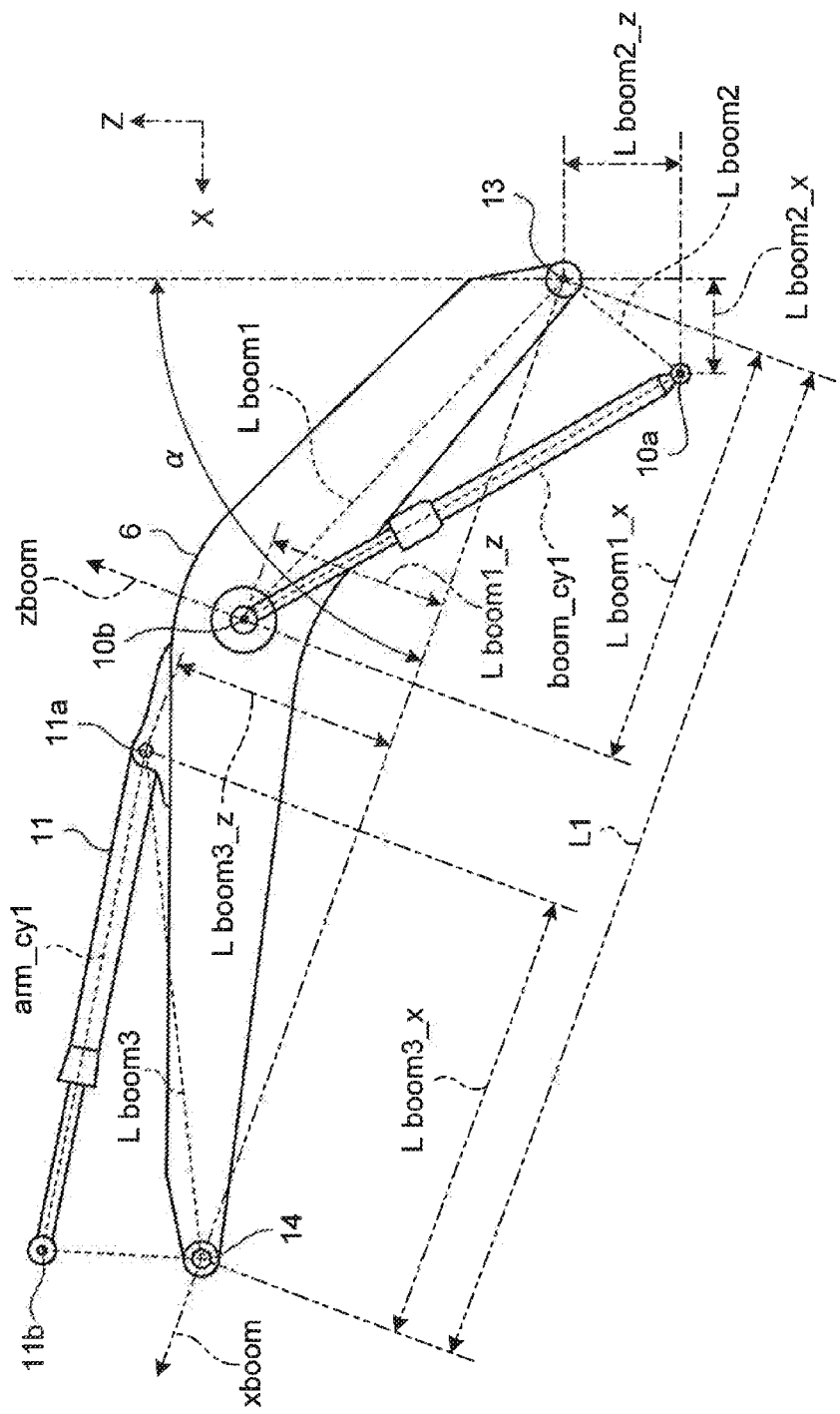
FIG. 5 is a side view of a boom.

FIG. 5 is a side view of the boom 6. The rotation angle α of the boom 6 is expressed by the following Equation (2) using the working machine parameters shown in FIG. 5.

$$\alpha = \arctan\left(-\frac{Lboom2\_x}{Lboom2\_z}\right) - \quad (2)$$

-continued
$$\arccos\left(\frac{Lboom1^2 + Lboom2^2 - boom\_cyl^2}{2 * Lboom1 * lboom2}\right) + \arctan\left(\frac{Lboom1\_x}{Lboom1\_z}\right)$$

As illustrated in FIG. 5, the parameter Lboom2_x denotes a distance between the boom cylinder foot pin 10a and the boom pin 13 in a horizontal direction of the vehicle body 1 to which the boom 6 is attached, that is, a direction equivalent to the x-axis direction of the vehicle body coordinate system. The parameter Lboom2_z denotes a distance between the boom cylinder foot pin 10a and the boom pin 13 in a vertical direction of the vehicle body 1 to which the boom 6 is attached, that is, in a direction equivalent to the z-axis direction of the vehicle body coordinate system. The parameter Lboom1 denotes a distance between the boom cylinder top pin 10b and the boom pin 13. The parameter Lboom2 denotes a distance between the boom cylinder foot pin 10a and the boom pin 13. The parameter boom_cyl denotes a distance between the boom cylinder foot pin 10a and the boom cylinder top pin 10b. The parameter Lboom1_z denotes a distance in a zboom-axis direction between the boom cylinder top pin 10b and the boom pin 13. In a side view, the direction linking the boom pin 13 and the arm pin 14 is designated as xboom axis, and the direction vertical to the xboom axis is designated as zboom axis. The parameter Lboom1_x denotes a distance in the xboom-axis direction between the boom cylinder top pin 10b and the boom pin 13.

Figure 6:
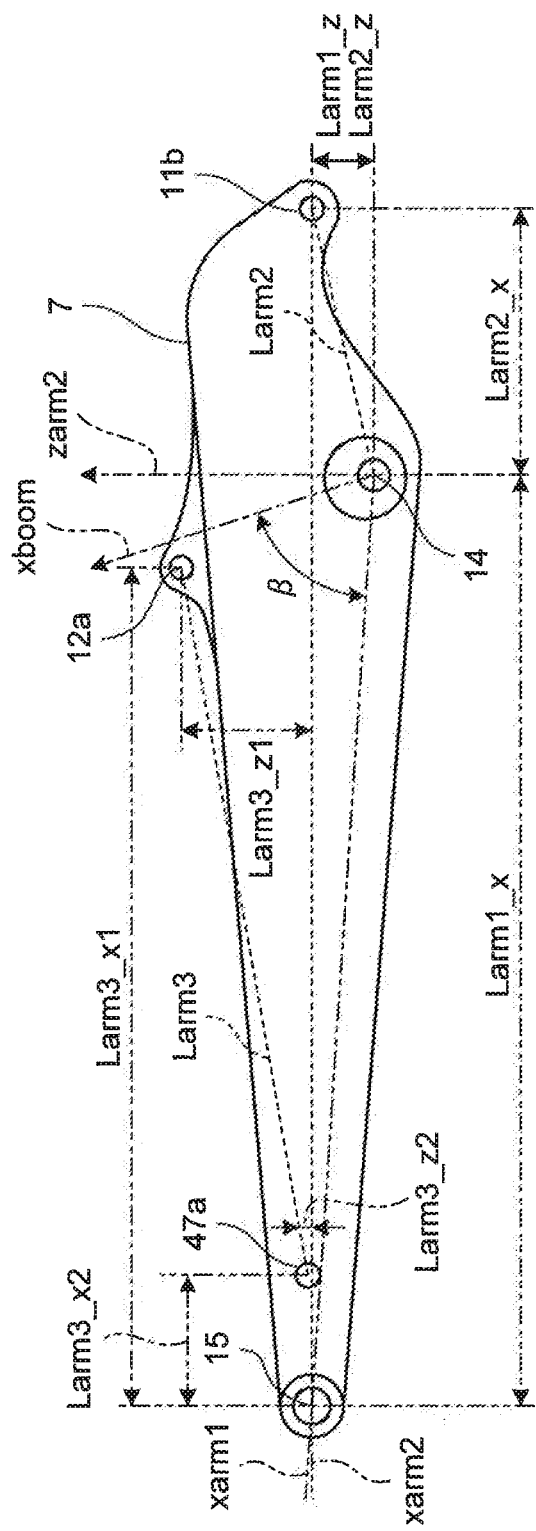
FIG. 6 is a side view of an arm.

FIG. 6 is a side view of the arm 7. The rotation angle β of the arm 7 is expressed by the following Equation (3) using the working machine parameters indicated in FIGS. 5 and 6.

$$\beta = \arctan\left(-\frac{Lboom3\_z}{Lboom3\_x}\right) + \arccos\left(\frac{Lboom3^2 + Lboom2^2 - arm\_cyl^2}{2 * Larm3 * Larm2}\right) + \arctan\left(\frac{Larm2\_x}{Larm2\_z}\right) + \arctan\left(\frac{Larm1\_x}{Larm1\_z}\right) - \pi \quad (3)$$

As illustrated in FIG. 5, the parameter Lboom3_z denotes a distance between the arm cylinder foot pin 11a and the arm pin 14 in a zboom-axis direction. The parameter Lboom3_x denotes a distance between the arm cylinder foot pin 11a and the arm pin 14 in the xboom-axis direction. The parameter Lboom3 denotes a distance between the arm cylinder foot pin 11a and the arm pin 14. As illustrated in FIG. 6, the parameter Larm2 denotes a distance between the arm cylinder top pin 11b and the arm pin 14. As illustrated in FIG. 5, the parameter arm_cyl denotes a distance between the arm cylinder foot pin 11a and the arm cylinder top pin 11b. As illustrated in FIG. 6, the parameter Larm2_x denotes a distance between the arm cylinder top pin 11b and the arm pin 14 in a xarm2-axis direction. The parameter Larm2_z denotes a distance between the arm cylinder top pin 11b and the arm pin 14 in a zarm2-axis direction. In a side view, the direction linking the arm cylinder top pin 11b and the bucket pin 15 is designated as xarm2 axis, and the direction vertical to the xarm2 axis is designated as zarm2 axis. The parameter Larm1_x denotes a distance in the xarm2-axis direction between the arm pin 14 and the bucket pin 15. The parameter Larm1_z denotes a distance in the zarm2-axis direction between the arm pin 14 and the bucket pin 15. In a side view, the direction linking the arm pin 14 and the bucket pin 15 is designated as xarm1 axis. The rotation angle β of the arm 7 is an angle formed by the xboom axis and the xarm1 axis.

Figure 7:
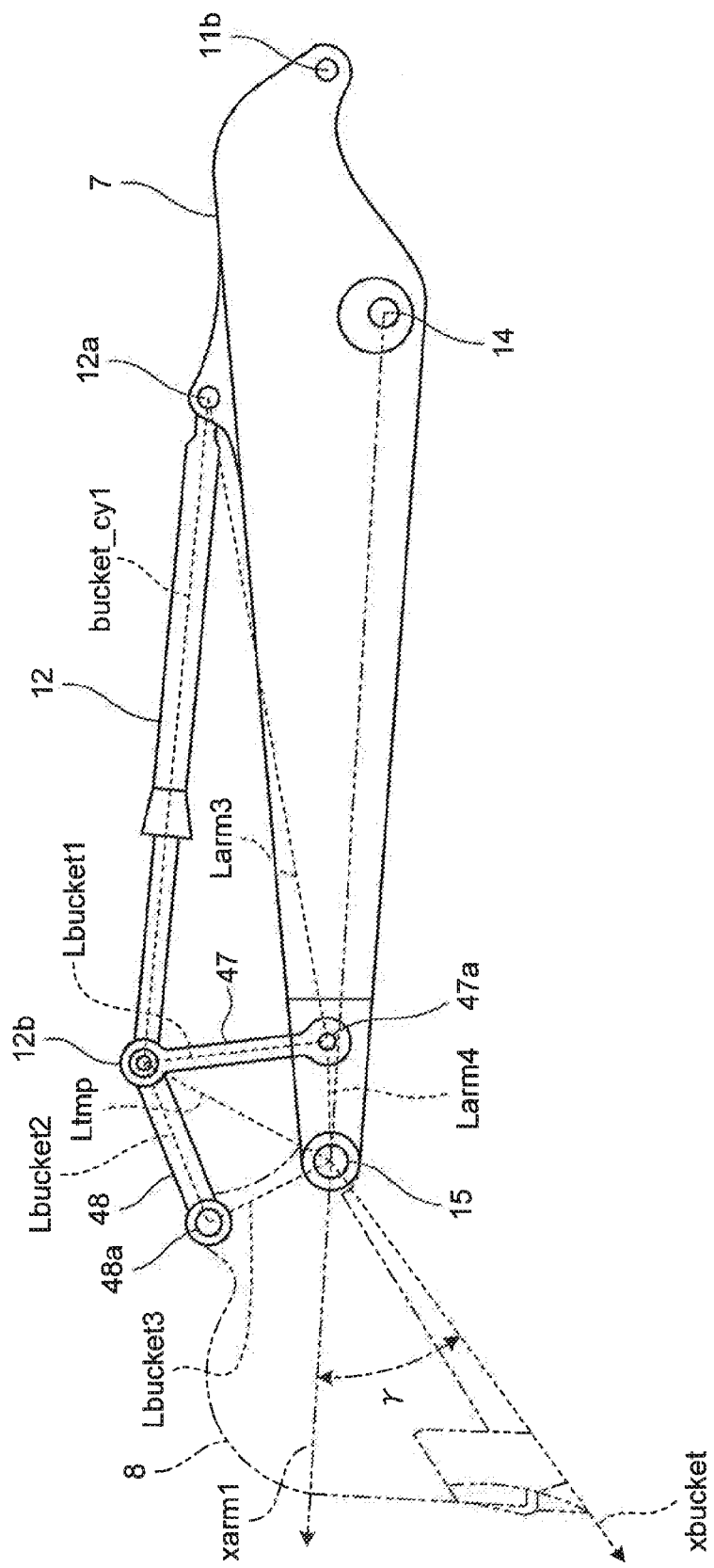
FIG. 7 is a side view of a bucket and the arm.
Figure 8:
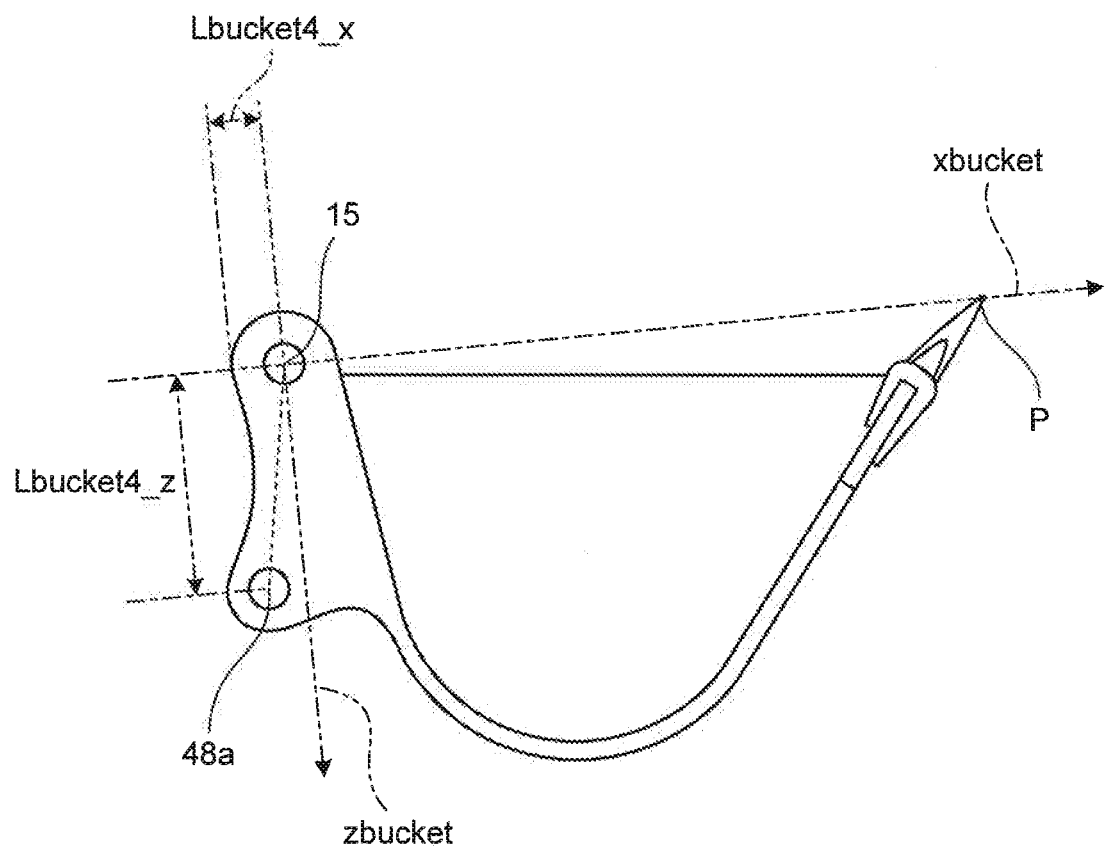
FIG. 8 is a side view of the bucket.
Figure 9:
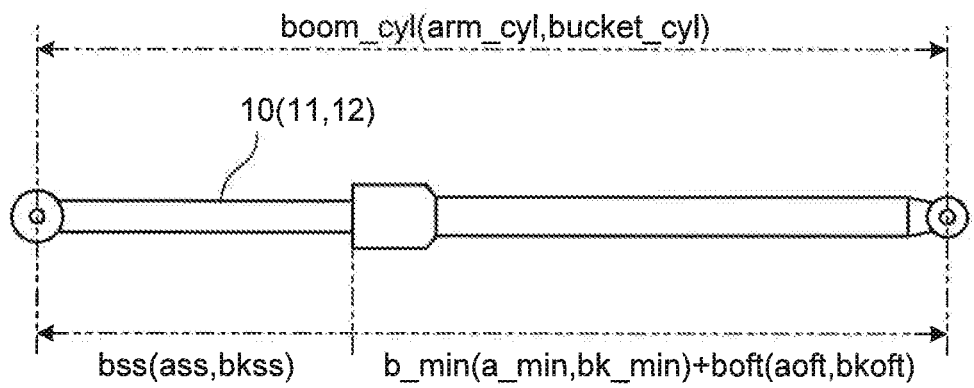
FIG. 9 is a diagram illustrating a method for computing parameters indicative of length of a cylinder.

FIG. 7 is a side view of the bucket 8 and the arm 7. FIG. 8 is a side view of the bucket 8. FIG. 9 is a diagram illustrating a method for computing parameters indicative of length of a cylinder. The rotation angle γ of the bucket 8 is expressed by the following Equation (4) using the working machine parameters indicated in FIGS. 6 to 8.

$$\gamma = \arctan\left(\frac{Larm1\_z}{Larm1\_x}\right) + \arctan\left(\frac{Larm3\_z2}{Larm3\_x2}\right) + \qquad (4)$$
$$\arctan\left(\frac{Ltmp^2 + Larm4^2 - Lbucket1^2}{2*Ltmp*Larm4}\right) +$$
$$\arccos\left(\frac{Ltmp^2 + Lbucket3^2 - Lbucket2^2}{2*Ltmp*Lbucket3}\right) +$$
$$\arctan\left(\frac{Lbucket4\_x}{Lbucket4\_z}\right) + \frac{\pi}{2} - \pi$$

As illustrated in FIG. 6, the parameter Larm3_z2 denotes a distance between the first link pin 47a and the bucket pin 15 in a zarm2-axis direction. The parameter Larm3_x2 denotes a distance between the first link pin 47a and the bucket pin 15 in a xarm2-axis direction. As illustrated in FIG. 7, the parameter Ltmp denotes a distance between the bucket cylinder top pin 12b and the bucket pin 15. The parameter Larm4 denotes a distance between the first link pin 47a and the bucket pin 15. The parameter Lbucket1 denotes a distance between the bucket cylinder top pin 12b and the first link pin 47a. The parameter Lbucket3 denotes a distance between the bucket pin 15 and the second link pin 48a. The parameter Lbucket2 denotes a distance between the bucket cylinder top pin 12b and the second link pin 48a. As illustrated in FIG. 8, the parameter Lbucket4_x denotes a distance between the bucket pin 15 and the second link pin 48a in an xbucket-axis direction. The parameter Lbucket4_z denotes s a distance between the bucket pin 15 and the second link pin 48a in a zbucket-axis direction. In a side view, the direction linking the bucket pin 15 and the blade edge P of the bucket 8 is designated as xbucket axis, and the direction vertical to the xbucket axis is designated as zbucket axis. The rotation angle γ of the bucket 8 is an angle formed by the xbucket axis and the xarm1 axis. The foregoing parameter Ltmp is expressed by the following Equation (5).

$$Ltmp = \sqrt{Larm4^2 + Lbucket1^2 - 2Larm4*Lbucket1*\cos\phi} \qquad (5)$$
$$\phi = \pi + \arctan\left(\frac{Larm3\_z2}{Larm3\_x2}\right) - \arctan\left(\frac{Larm3\_z1 - Larm3\_z2}{Larm3\_x1 - Larm3\_x2}\right) -$$
$$\arccos\left\{\frac{Lbucket1^2 + Larm3^2 - bucket\_cyl^2}{2*Lbucket1*Larm3}\right\}$$

As illustrated in FIG. 6, The parameter Larm3 denotes a distance between the bucket cylinder foot pin 12a and the first link pin 47a. The parameter Larm3_x1 denotes a distance between the bucket cylinder foot pin 12a and the bucket pin 15 in a xarm2-axis direction. The parameter Larm3_z1 denotes a distance between the bucket cylinder foot pin 12a and the bucket pin 15 in a zarm2-axis direction.

The foregoing parameter boom_cyl takes a value obtained by adding minimum length b_min of the boom cylinder and boom cylinder offset boft to stroke length bss of the boom cylinder 10 detected by the first angle detection unit 16, as illustrated in FIG. 9. Similarly, the parameter arm_cyl takes a value obtained by adding minimum length a min of the arm cylinder and arm cylinder offset aoft to stroke length ass of the arm cylinder 11 detected by the second angle detection unit 17. Similarly, the parameter bucket_cyl takes a value obtained by adding minimum length bk_min of the bucket cylinder 12 and bucket cylinder offset bkoft to stroke length bkss of the bucket cylinder 12 detected by the third angle detection unit 18.

<Calibration Device 60>

The calibration device 60 is a device to calibrate parameters necessary for computing the foregoing rotation angles α, β, and γ and computing the position of the blade edge of the bucket 8 at the excavator 100. The calibration device 60 also can conduct data communications with the display controller 39 in a wired or wireless manner. The calibration device 60 calibrates the parameters indicated in FIG. 4 based on the information measured by the external measurement device 62. The calibration of the parameters is performed at shipping of the excavator 100 or initial setting of the excavator 100 after maintenance, for example.

Figure 10:
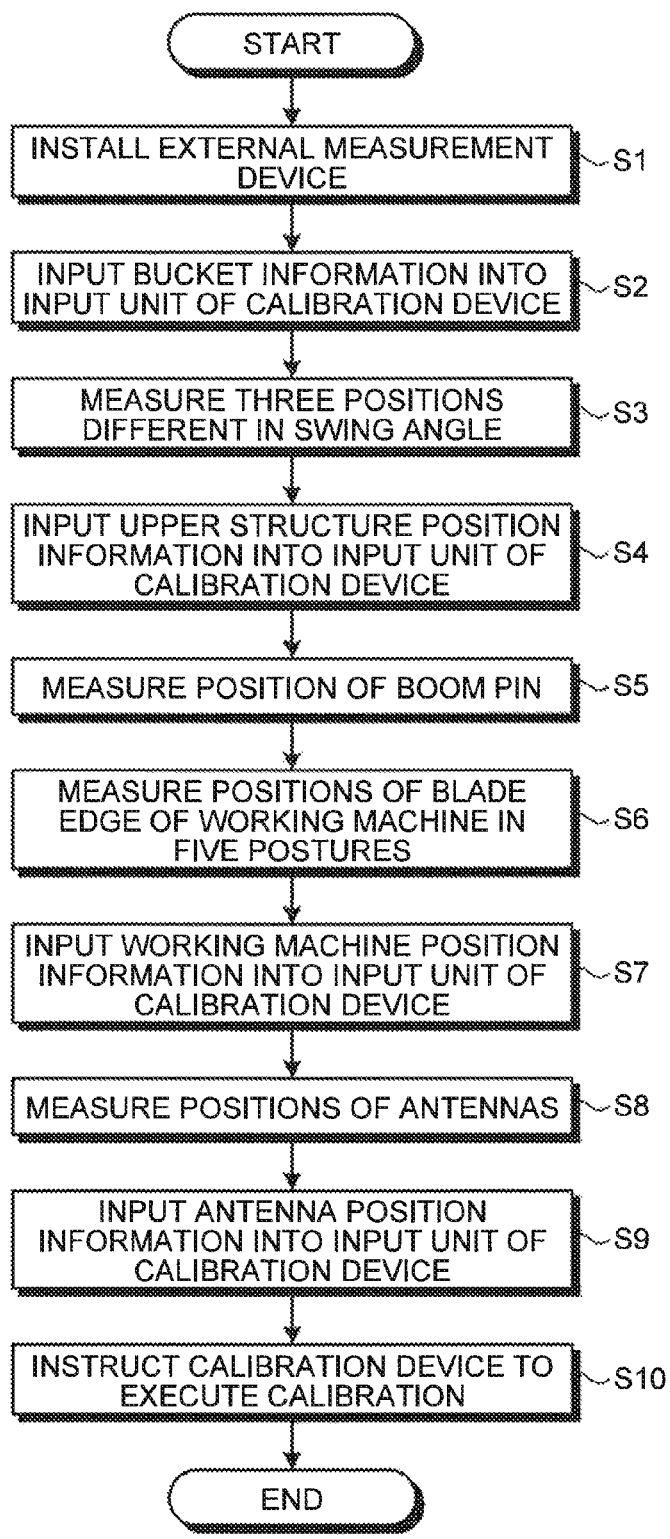
FIG. 10 is a flowchart of a working procedure performed by an operator during calibration.
Figure 11:
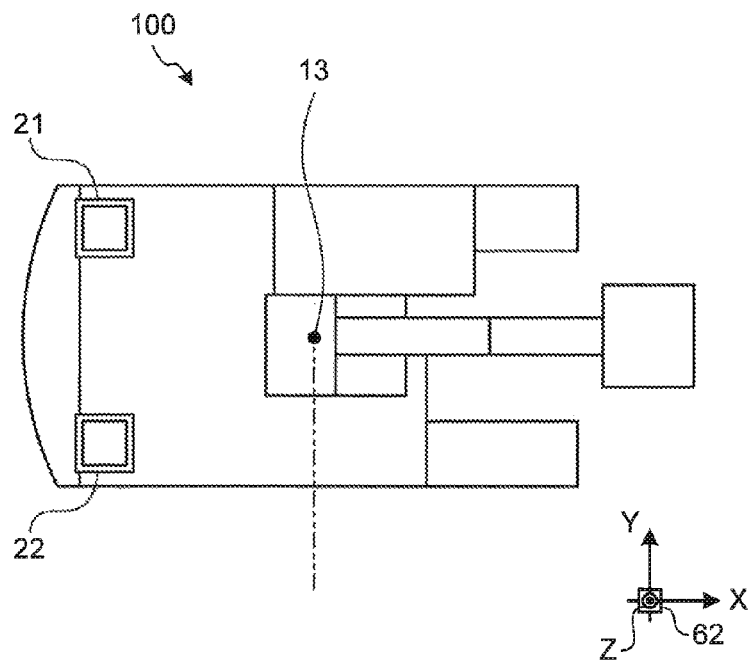
FIG. 11 is a diagram illustrating an installation position of an external measurement device.
Figure 12:
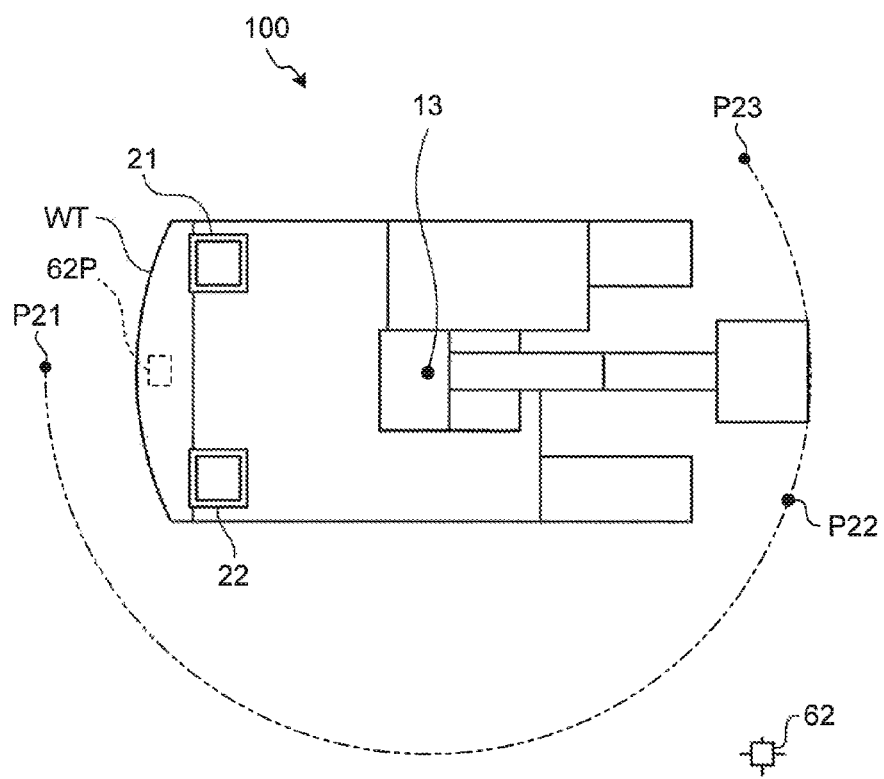
FIG. 12 is a top view of three positions of an upper structure different in swing angle.

FIG. 10 is a flowchart of a working procedure performed by an operator during calibration. FIG. 11 is a diagram illustrating an installation position of the external measurement device 62. FIG. 12 is a top view of three positions of the upper structure 3 different in swing angle. First, at step S1, the operator installs the external measurement device 62. At that time, the operator installs the external measurement device 62 at a predetermined distance from the boom pin 13 as illustrated in FIG. 11.

At step S2, the operator inputs bucket information into an input unit 63 of the calibration device 60 illustrated in FIG. 3. The bucket information relates to the dimension of the bucket 8. The bucket information includes the distance (Lbucket4_x) between the bucket pin and the second link pin 48a in the xbucket-axis direction and the distance (Lbucket4_z) between the bucket pin 15 and the second link pin 48a in the zbucket-axis direction. The operator inputs design values or measurement values measured by a measurement means such as a measuring tape, as the bucket information.

At step S3, the operator measures three positions of the upper structure 3 different in swing angle. In the embodiment, as illustrated in FIG. 12, the operator operates the swing operation member 51 illustrated in FIG. 3 to swing the upper structure 3. At that time, the working machine 2 is kept in a fixed posture. In addition, the operator uses the external measurement device 62 to measure the position of a prism 62P attached to the lower part of a counter weight WT in the upper structure 3 by the external measurement device 62. Three positions of the prism 62P different in swing angle are measured as the positions of the upper structure 3 (hereinafter, a first swing position P21, a second swing position P22, and a third swing position P23).

In the embodiment, instead of the positions of the prism 62P, three positions of the blade edge different in swing angle may be measured as positions of the upper structure 3. In this case, the working machine 2 is also kept in a fixed posture.

At step S4, the operator inputs upper structure position information into the input unit 63 of the calibration device 60. The upper structure position information includes coordinates indicating the first swing position P21, the second swing position P22, and the third swing position P23 measured by the operator using the external measurement device 62 at step S3.

At step S5, the operator uses the external measurement device 62 to measure the position of a center on a side surface of the boom pin 13. The coordinate system of the external measurement device 62 is the earth's gravitational coordinate system X-Y-Z. The Z-axis direction of the earth's gravitational coordinate system X-Y-Z agrees with the direction of action of gravitational force. The X-axis direction and the Y-axis direction are orthogonal to the Z-axis direction, and the X-axis direction and the Y-axis direction are orthogonal to each other.

Figure 13:
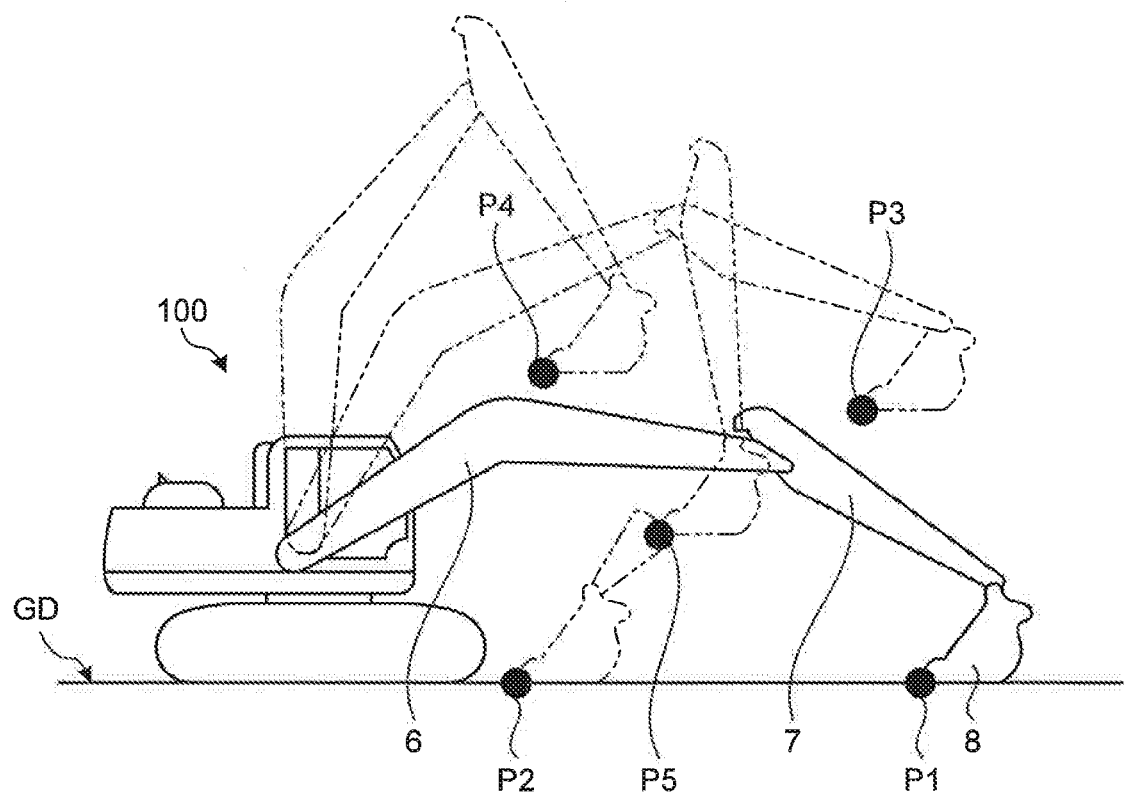
FIG. 13 is a side view of positions of a blade edge in a working machine 2 in five postures.

FIG. 13 is a side view of positions of a blade edge in the working machine 2 in five postures. At step S6, the operator uses the external measurement device 62 illustrated in FIG. 11 to measure the positions of the blade edge of the working machine 2 in five postures. The operator operates the working machine operation member 31 illustrated in FIG. 3 to move the blade edge of the bucket 8 to five positions from first position P1 to fifth position P5 illustrated in FIG. 13. The first position P1 to the fifth position P5 correspond to the positions of the working point. At that time, the upper structure 3 is not swung but is kept in a state fixed to the chassis 5. The operator measures the coordinates of the blade edge at the first position P1 to the fifth position P5 using the external measurement device 62.

The first position P1 and the second position P2 are different in the anteroposterior direction of the vehicle body on ground GD. The third position P3 and the fourth position P4 are different in the anteroposterior direction of the vehicle body in the air. The third position P3 and the fourth position P4 are different in the vertical direction from the first position P1 and the second position P2. The fifth position P5 is positioned between the first position P1 and the second position P2 and the third position P3 and the fourth position P4.

Figure 14:
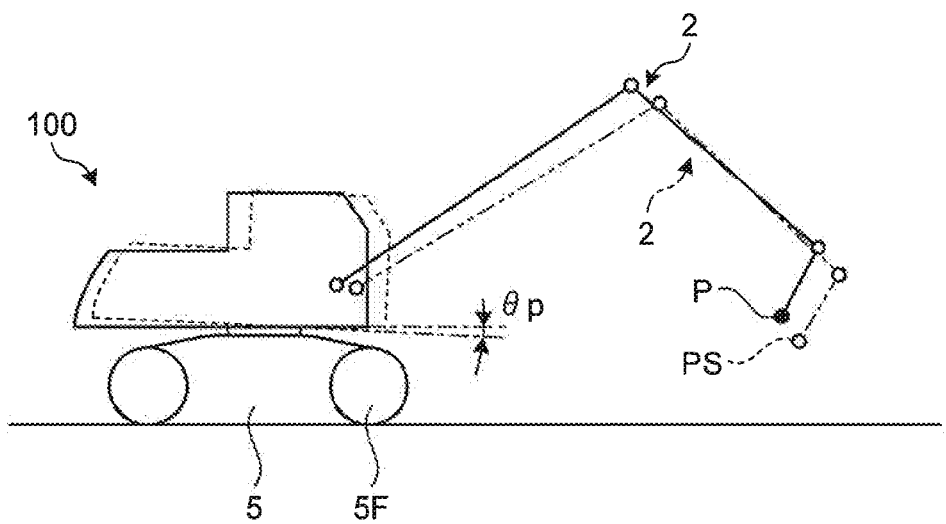
FIG. 14 is a side view of the excavator.
Figure 15:
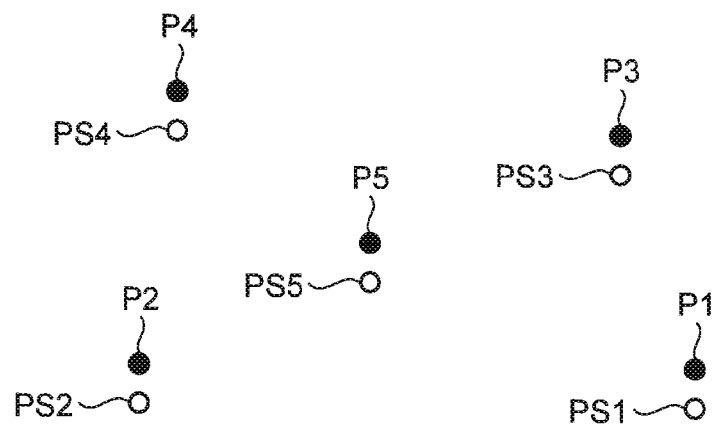
FIG. 15 is a diagram illustrating first to fifth positions of the excavator in the case where the excavator is inclined in the anteroposterior direction of the vehicle body under weight of the working machine 2 and original first to fifth positions of the excavator.

FIG. 14 is a side view of the excavator 100. FIG. 15 is a diagram illustrating first position PS1 to fifth position PS5 of the excavator 100 in the case where the excavator 100 is inclined in the anteroposterior direction of the vehicle body due to weight of the working machine 2 and the original first position P1 to fifth positions P5 of the excavator 100. At step S6, when the position P of the blade edge of the working machine 2 in the five postures is measured by the external measurement device 62, the position P of the blade edge is shifted from the assumed position because of inclination of the excavator 100 in the anteroposterior direction of the vehicle body due to the weight of the working machine 2. This may lead to a deterioration of the accuracy of calibration. Specifically, when the excavator 100 is inclined in the anteroposterior direction of the vehicle body due to the weight of the working machine 2 as illustrated in FIG. 14, position PS of the blade edge measured by the external measurement device 62 goes below the original position P of the blade edge. Thus, the first position PS1 to the fifth position PS5 measured by the external measurement device 62 go below the original first position P1 to fifth position P5 as illustrated in FIG. 15.

In the case where the excavator 100 is inclined in the anteroposterior direction of the vehicle body due to the weight of the working machine 2, the excavator 100 is inclined around the lower side of a rotational wheel 5F in the working machine 2 side of the chassis 5, for example, as illustrated in FIG. 14. In that case, the posture angle of the excavator 100, that is, the pitch angle is designated as θp. In the embodiment, the pitch angle θp as inclination information of the excavator in the anteroposterior direction of the vehicle body is used to correct the first position PS1 to the fifth position PS5 measured by the external measurement device 62, that is, positions of the working points, to the original first position P1 to fifth position P5. Then, based on the coordinates at a plurality of corrected positions of the working points, calibrated values of the parameters necessary for computing the position of the blade edge are computed. This controls a deterioration of the accuracy of measuring the position of the blade edge in the height direction of the excavator 100. The calibration is executed using the corrected value to control the deterioration of the accuracy of calibration. The correction of the position of the blade edge measured by the external measurement device 62 will be described later.

At step S7, the operator inputs working machine position information into the input unit 63 of the calibration device 60. The working machine position information indicates the coordinates at the first position P1 to the fifth position P5 of the blade edge of the bucket 8 measured by the external measurement device 62. The operator inputs the coordinates at the first position P1 to the fifth position P5 of the blade edge of the bucket 8 measured using the external measurement device 62 at step S6, into the input unit 63 of the calibration device 60.

Figure 16:
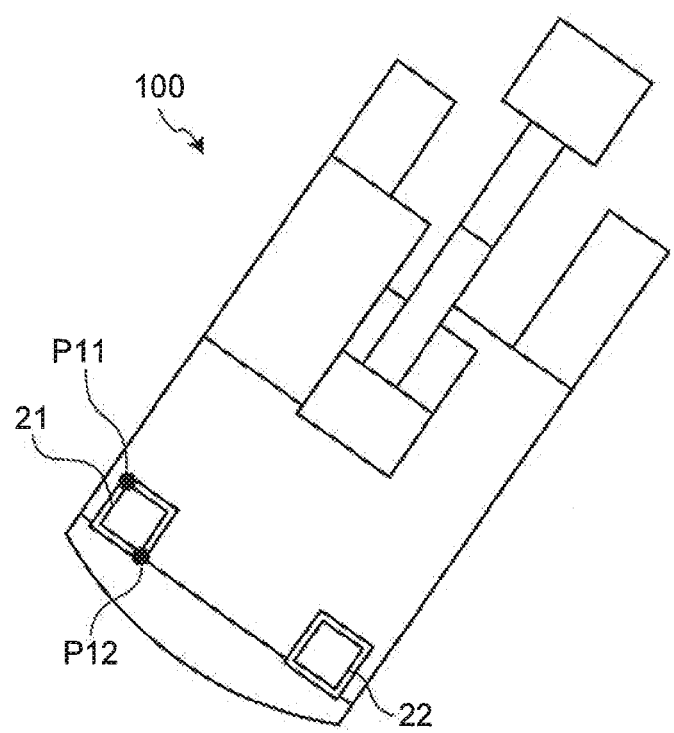
FIG. 16 is a top view of positions of a first measurement point and a second measurement point on a reference antenna.
Figure 17:
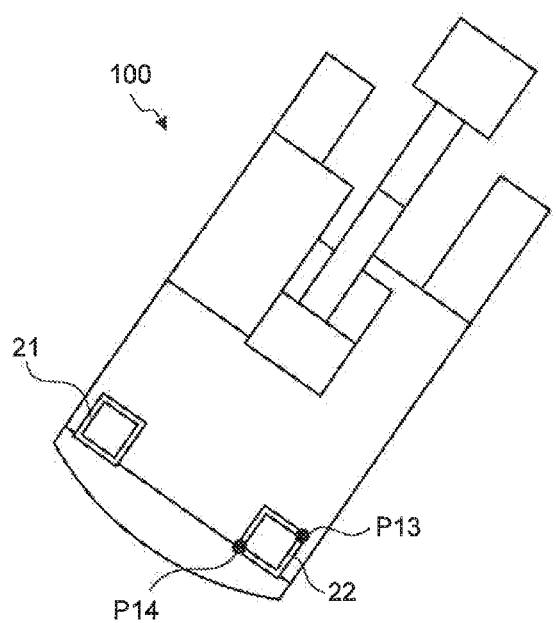
FIG. 17 is a top view of a third measurement point and a fourth measurement point on a directional antenna.

FIG. 16 is a top view of positions of a first measurement point and a second measurement point on the reference antenna. FIG. 17 is a top view of a third measurement point and a fourth measurement point on the directional antenna. At step S8, the operator measures the positions of the antennas 21 and 22 using the external measurement device 62. Here, as illustrated in FIG. 16, the operator measures the positions of a first measurement point P11 and a second measurement point P12 on the reference antenna 21 using the external measurement device 62. The first measurement point P11 and the second measurement point P12 are arranged symmetrically with respect to a center on a top surface of the reference antenna 21. As illustrated in FIGS. 16 and 17, when the shape of the top surface of the reference antenna 21 is rectangular or square, the first measurement point P11 and the second measurement point P12 are two diagonal points on the top surface of the reference antenna 21.

As illustrated in FIG. 17, the operator uses the external measurement device 62 to measure the positions of a third measurement point P13 and a fourth measurement point P14 on the directional antenna 22. The third measurement point P13 and the fourth measurement point P14 are arranged symmetrically with respect to a center on a top surface of the directional antenna 22. Similarly to the first measurement point P11 and the second measurement point P12, the third measurement point P13 and the fourth measurement point P14 are two diagonal points on the top surface of the directional antenna 22. The first measurement point P11 to the fourth measurement point P14 are preferably given marks for facilitating measurement. For example, the marks may be bolts or the like as parts of the antennas 21 and 22.

At step S9, the operator inputs antenna position information into the input unit of the calibration device 60 illustrated in FIG. 3. The antenna position information includes the coordinates indicating the positions of the first measurement point P11 to the fourth measurement point P14 measured by the operator using the external measurement device 62 at step S6. At step S10, the operator instructs the calibration device 60 illustrated in FIG. 3 to execute calibration.

Next, the process executed at the calibration device 60 will be described. As illustrated in FIG. 3, the calibration device 60 has the input unit 63, a display unit 64, and a computation unit 65 illustrated in FIG. 3. The input unit 63 is a unit into which the foregoing working machine position information, upper structure position information, antenna position information, and bucket information are input. The input unit 63 includes a configuration for the operator to input manually the foregoing information, and has a plurality of keys, for example. The input unit 63 may be a touch panel-type unit which allows inputting of numerical values. The display unit 64 is an LCD, for example, on which an operation screen for performing calibration is displayed.

Figure 18:
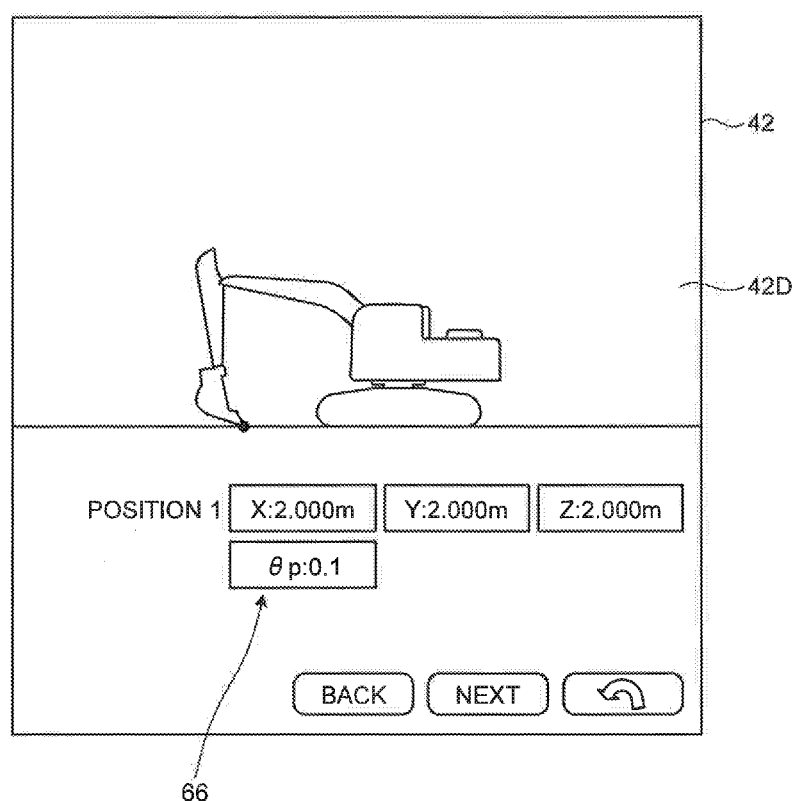
FIG. 18 is a diagram illustrating one example of an operation screen of the calibration device.

FIG. 18 is a diagram illustrating one example of an operation screen of the calibration device 60. Inputting areas 66 for inputting the foregoing information are displayed on an operation screen 42D of the display unit 42. The operator operates the input unit 63 to input the foregoing information into the inputting areas 66 in the operation screen. The information input into the inputting areas 66 includes the coordinates at the first position P1 to the fifth position P5 measured by the external measurement device 62 and the pitch angle $\theta p$ of the excavator 100 detected by the IMU 24 illustrated in FIGS. 2A to 2C and 3, and others.

Figure 19:
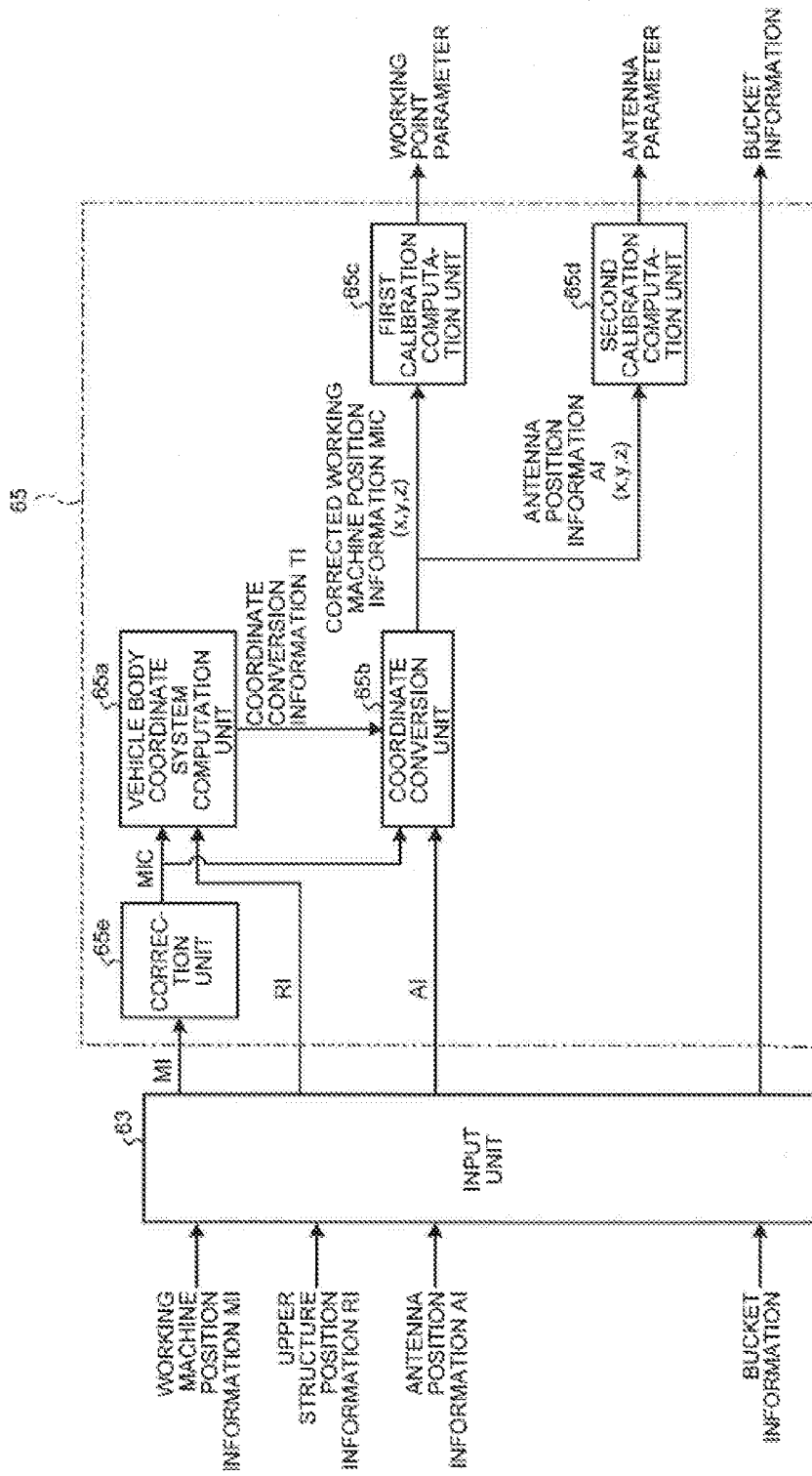
FIG. 19 is a functional block diagram illustrating processing functions related to calibration of a computation unit.

FIG. 19 is a functional block diagram illustrating processing functions related to calibration at the computation unit 65. The computation unit 65 executes the process of calibrating the parameters based on the information input via the input unit 63. The computation unit 65 has a vehicle-body-coordinate-system computation unit 65a, a coordinate conversion unit 65b, a first calibration computation unit 65c, a second calibration computation unit 65d, and a correction unit 65e.

Figure 20:
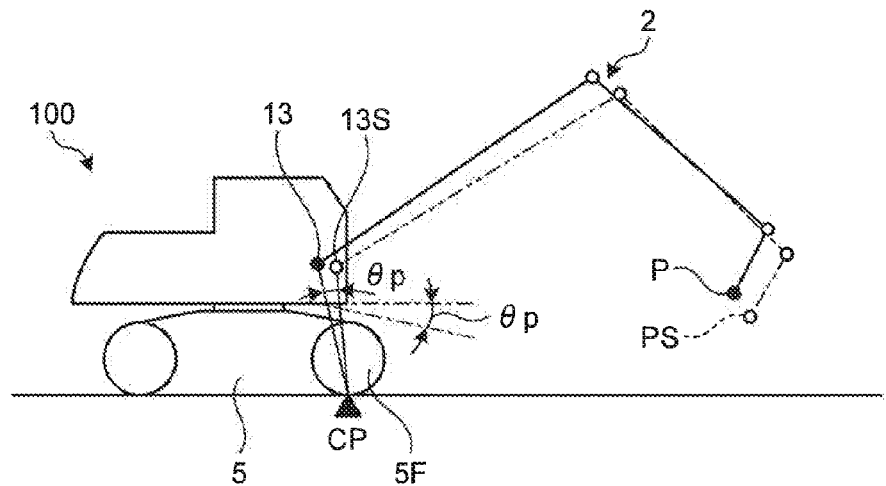
FIG. 20 is a side view of the excavator.
Figure 21:
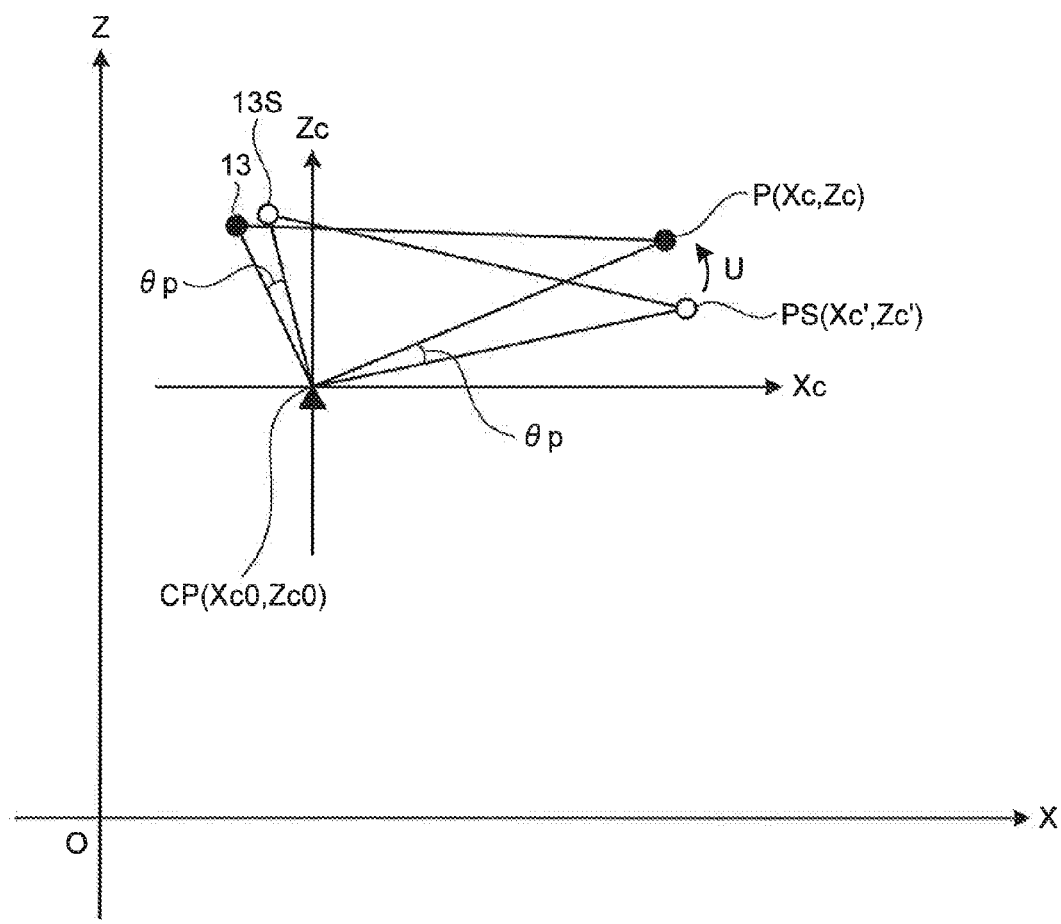
FIG. 21 is a diagram illustrating one example of a method for calibrating a position of a blade edge measured by the external measurement device.

FIG. 20 is a side view of the excavator 100. FIG. 21 is a diagram illustrating one example of a method for calibrating the position PS of the blade edge measured by the external measurement device 62. The correction unit 65e corrects the position PS of the blade edge measured by the external measurement device 62 based on the pitch angle $\theta p$. The working machine position information MI, that is, the first position PS1 to the fifth position PS5 measured by the external measurement device 62 go below the original positions under influence of the weight of the working machine 2. Thus, the correction unit 65e corrects the first position PS to the fifth position PS5 to the original first position P1 to fifth position P5 using the pitch angle $\theta p$.

Assuming that the excavator 100 is inclined in the anteroposterior direction of the vehicle body around the lower side of the rotational wheel 5F of the chassis 5 on the working machine 2 side, as illustrated in FIG. 20, the center of the inclination is defined as position CP. In addition, the pitch angle of the excavator 100 inclined in the anteroposterior direction of the vehicle body is defined as pitch angle $\theta p$. When the excavator 100 is inclined in the anteroposterior direction of the vehicle body, the boom pin 13 rotates around the position CP. The position of the boom pin 13 when the excavator 100 is inclined in the anteroposterior direction of the vehicle body is indicated with reference numeral 13S. By rotation of the boom pin 13, the working machine 2 also rotates around the position CP and thus the blade edge changes from the position P to the position PS.

As illustrated in FIG. 21, in the earth's gravitational coordinate system X-Z which is the coordinate system of the external measurement device 62, the coordinates of the position CP are designated as (Xc0, Zc0). A coordinate system Xc-Zc whose origin is the position CP will be discussed. The coordinates of the origin of the coordinate system Xc-Zc, that is, the coordinates (Xc0, Zc0) of the position CP are separated by Xc0 in the X axis direction and by Zc0 in the Y axis direction, from origin point O (0, 0) in the earth's gravitational coordinate system X-Z.

The coordinates of the position PS of the blade edge measured by the external measurement device 62 in the earth's gravitational coordinate system X-Z are designated as (Xc', Zc'), and the coordinates of the position P of the blade edge at the original position of the working machine 2 in the earth's gravitational coordinate system X-Z are designated as (Xc, Yc). As seen from FIG. 21, the position P of the blade edge is determined by rotating the position PS of the blade edge by the pitch angle $\theta p$ in an upward direction U around the position CP, that is, the origin of the coordinate system Xc-Zc. The coordinates (Xc, Yc) of the position P of the blade edge can be determined by rotating and converting the coordinates (Xc', Zc') of the position PS of the blade edge measured by the external measurement device 62 around the origin of the coordinate system Xc-Zc whose origin is the position CP.

The position P of the blade edge in the coordinate system whose origin is the position CP is defined as coordinates (xc, zc). By using the coordinates (Xc', Zc') of the position PS of the blade edge in the earth's gravitational coordinate system X-Z, the position PS of the blade edge becomes coordinates (Xc'-Xc0, Zc'-Zc0) when the position CP is determined as the origin. Therefore, the coordinates (xc, zc) of the position P of the blade edge in the coordinate system with the position CP at the origin can be determined by the Equation (6). The coordinates (Xc, Zc) of the position P of the blade edge in the earth's gravitational coordinate system X-Z can be determined as coordinates (Xc0+xc, Zc0+zc) using the coordinates (xc, zc) obtained by the Equation (6) and the coordinates (Xc0, Zc0) of the position CP. The center of the inclination is not limited to the position CP but may be set in another position. For example, the position of a center of a swing axis linking the upper structure 3 and the chassis 5 may be set as center of the inclination.

$$\begin{pmatrix} x_c \\ z_c \end{pmatrix} = \begin{pmatrix} \cos\theta_P & -\sin\theta_P \\ \sin\theta_P & \cos\theta_P \end{pmatrix} \begin{pmatrix} X'_c - X_c 0 \\ Z'_c - Z_c 0 \end{pmatrix} \qquad (6)$$

The correction unit 65e corrects the first position PS1 to the fifth position PS5 measured by the external measurement device 62 using the Equation (6) and the pitch angle $\theta p$. The correction unit 65e outputs the corrected first position PS1 to fifth position PS5 as corrected-working-machine-position information MIC to the vehicle-body-coordinate-system computation unit 65a of the computation unit 65 illustrated in FIG. 19. In such a manner, the correction unit 65e corrects the first position PS1 to the fifth position PS5 measured by the external measurement device 62 to the original first position P1 to fifth position P5, which controls a deterioration of the accuracy of measuring the position of the blade edge in the height direction of the excavator 100.

The vehicle-body-coordinate-system computation unit 65a computes coordinate conversion information based on the corrected-working-machine-position information MIC and the upper structure position information RI input via the input unit 63. Coordinate conversion information is information to convert the coordinate system on the basis of the external measurement device 62 to the vehicle body coordinate system. The foregoing corrected-working-machine-position information MIC (working machine position information MI) and antenna position information AI are measured by the external measurement device 62 and thus are expressed by the earth's gravitational coordinate system X-Y-Z on the basis of the external measurement device 62. The coordinate conversion information TI is information to convert the corrected-working-machine-position information MIC and antenna position information AI from the earth's gravitational coordinate system on the basis of the external measurement device 62 to the vehicle body coordinate system x-y-z. Next, the method for computing the coordinate conversion information TI will be described.

Figure 22:
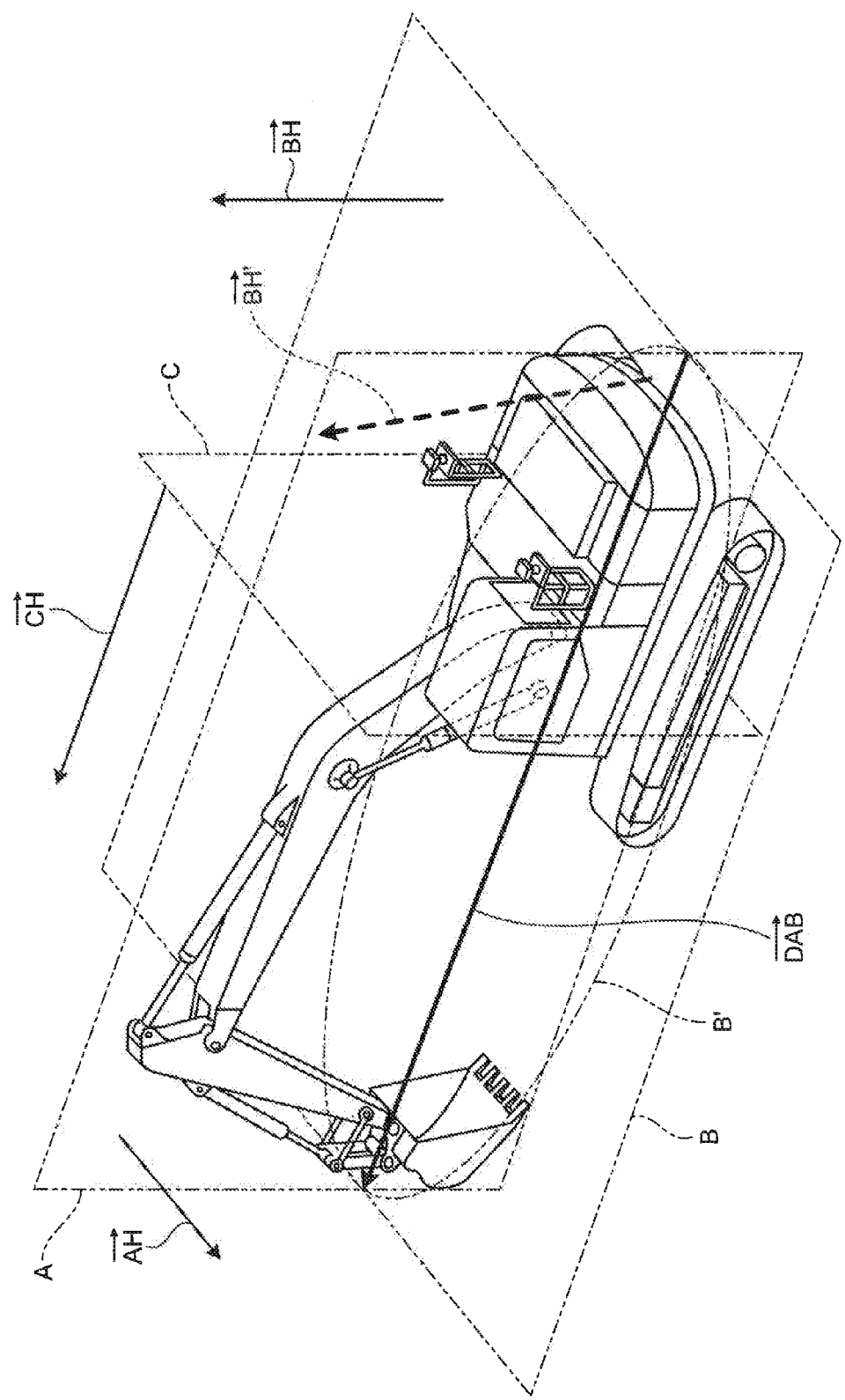
FIG. 22 is a diagram illustrating a method for computing coordinate conversion information.
Figure 23:
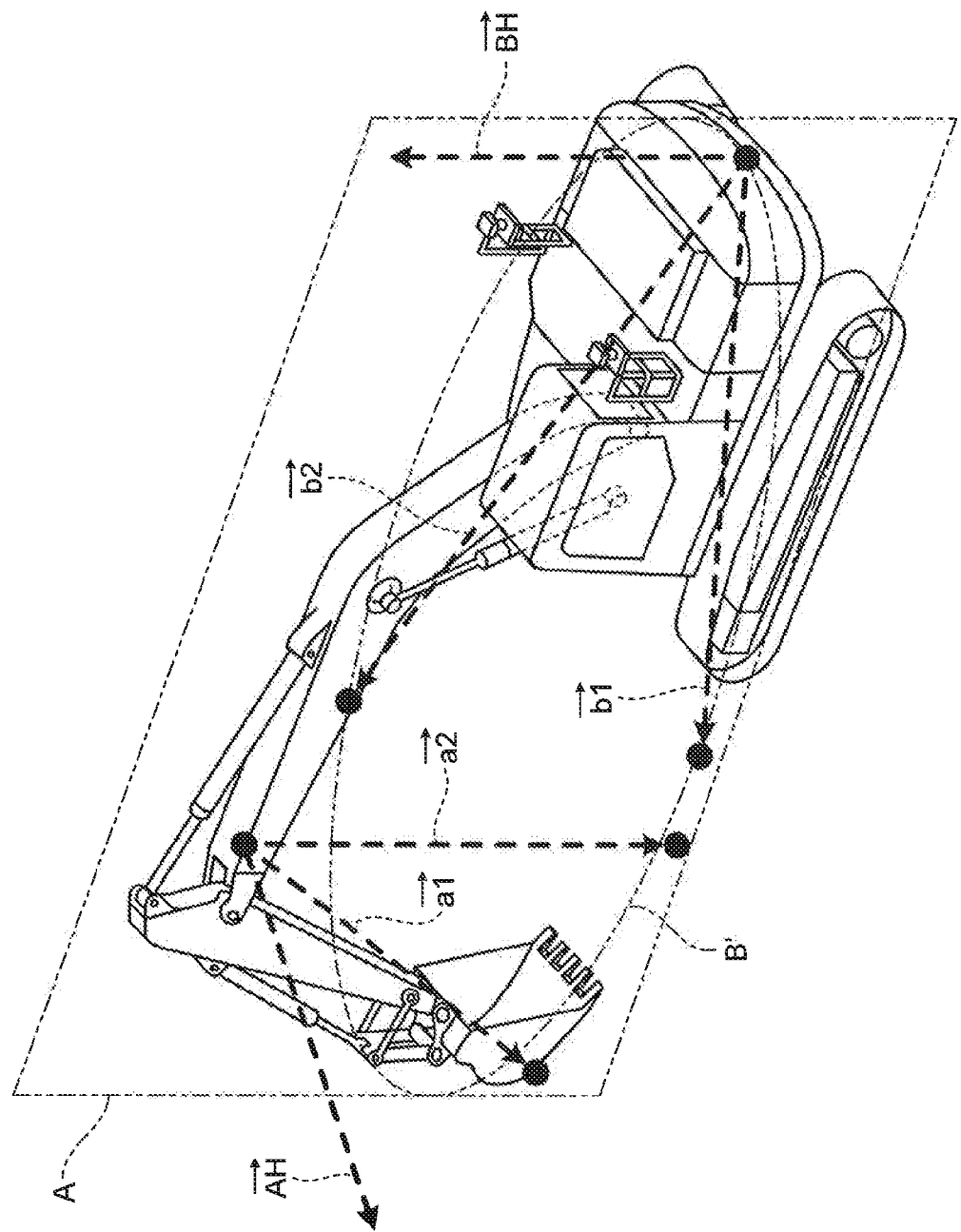
FIG. 23 is a diagram illustrating a method for computing coordinate conversion information.

FIGS. 22 and 23 are diagrams illustrating a method for computing coordinate conversion information. First, as illustrated in FIG. 22, the vehicle-body-coordinate-system computation unit 65a computes a first unit-normal vector AH vertical to an operation plane A of the working machine 2, based on the corrected-working-machine-position information MIC. The vehicle-body-coordinate-system computation unit 65a determines the operation plane of the working machine 2 using a least-square method from the five positions included in the corrected-working-machine-position information MIC, and then computes the first unit-normal vector AH based on the operation plane. The first unit-normal vector AH may be computed based on two vectors a1 and a2 determined from coordinates of three positions among the five positions included in the corrected-working-machine-position information MIC, which are not much deviated from two other positions.

Next, the vehicle-body-coordinate-system computation unit 65a computes a second unit-normal vector vertical to a swing plane B of the upper structure 3 based on the upper structure position information RI. Specifically, the vehicle-body-coordinate-system computation unit 65a computes a second unit-normal vector BH' vertical to a swing plane B' based on two vectors b1 and b2 determined from the coordinates of the first swing position P21, the second swing position P22, and the third swing position P23 included in the upper structure position information RI. Next, as illustrated in FIG. 19, the vehicle-body-coordinate-system computation unit 65a computes an intersection vector DAB of the foregoing operation plane A and the swing plane B' of the working machine 2.

The vehicle-body-coordinate-system computation unit 65a computes a unit normal vector of a plane B passing through the intersection vector DAB and vertical to the operation plane A of the working machine 2, as corrected second unit-normal vector BH. Then, the vehicle-body-coordinate-system computation unit 65a computes a third unit-normal vector CH vertical to the first unit-normal vector AH and the corrected second unit-normal vector BH.

The coordinate conversion unit 65b uses the coordinate conversion information to convert the corrected-working-machine-position information MIC and the antenna position information AI measured by the external measurement device 62 and corrected by the correction unit 65e, from the coordinate system X-Y-Z at the external measurement device 62 to the vehicle body coordinate system x-y-z at the excavator 100. The coordinate conversion information includes the foregoing first unit-normal vector AH, the corrected second unit-normal vector BH, and the third unit-normal vector CH. Specifically, as indicated by the following Equation (7), the coordinates in the vehicle body coordinate system are computed by the inner product of the coordinates in the coordinate system of the external measurement device 62 indicated by vector p and the normal vectors AH, BH, and CH in the coordinate conversion information.

$$x = \vec{p} \cdot \overline{CH}$$

$$y = \vec{p} \cdot \overline{AH}$$

$$z = \vec{p} \cdot \overline{BH} \quad (7)$$

The first calibration computation unit 65c computes calibrated values of parameters using numerical analysis, based on the corrected-working-machine-position information MIC converted into the vehicle body coordinate system. Specifically, the first calibration computation unit 65c computes calibrated values of parameters by a least-square method as indicated in the following Equation (8).

$$J = \frac{1}{2}\sum_{k=1}^{n}\{L1\sin(\alpha k) + L2\sin(\alpha k + \beta k) + L3\sin(\alpha k + \beta k + \gamma k) - xk\}^2 + \frac{1}{2}\sum_{k=1}^{n}\{L1\cos(\alpha k) + L2\cos(\alpha k + \beta k) + L3\cos(\alpha k + \beta k + \gamma k) - zk\}^2 \quad (8)$$

The value of k in the Equation (8) corresponds to the first position P1 to the fifth position P5 in the corrected-working-machine-position information MIC. Therefore, n=5. The coordinates (x1, z1) refer to coordinates of the first position P1 in the vehicle body coordinate system. The coordinates (x2, z2) refer to coordinates of the second position P2 in the vehicle body coordinate system. The coordinates (x3, z3) refer to coordinates of the third position P3 in the vehicle body coordinate system. The coordinates (x4, z4) refer to coordinates of the fourth position P4 in the vehicle body coordinate system. The coordinates (x5, z5) refer to coordinates of the fifth position P5 in the vehicle body coordinate system. The calibrated values of the working machine parameters are computed by searching for a point at which the function J of the Equation (8) becomes the smallest.

Specifically, the calibrated values of the working machine parameters No. 1 to No. 29 in the list of FIG. 4. Of the working machine parameters included in the list of FIG. 4, with respect to the distance Lbucket4_x between the bucket pin 15 and the second link pin 48a in xbucket-axis direction and the distance Lbucket4_z between the bucket pin 15 and the second link pin 48a in-zbucket axis direction, values input as the bucket information are used.

The second calibration computation unit 65d calibrates antenna parameters based on the antenna position information AI input into the input unit 63. Specifically, the second calibration computation unit 65d computes the coordinates of a midpoint between the first measurement point P11 and the second measurement point P12 as coordinates of the position of the reference antenna 21. More specifically, the coordinates of the position of the reference antenna 21 are expressed by distance Lbbx between the foregoing boom pin 13 and the reference antenna 21 in the x-axis direction in the vehicle body coordinate system, distance Lbby between the boom pin 13 and the reference antenna 21 in the y-axis direction in the vehicle body coordinate system, and distance Lbbz between the foregoing boom pin 13 and the reference antenna 21 in the z-axis direction in the vehicle body coordinate system.

The second calibration computation unit 65d also computes the coordinates of a midpoint between the third measurement point P13 and the fourth measurement point P14 as coordinates of the position of the directional antenna 22. Specifically, the coordinates of the position of the directional antenna 22 are expressed by distance LbdX between the boom pin 13 and the directional antenna 22 in the x-axis direction in the vehicle body coordinate system, distance Lbdy between the boom pin 13 and the directional antenna 22 in the y-axis direction in the vehicle body coordinate system, and distance Lbdz between the boom pin 13 and the directional antenna 22 in the z-axis direction in the vehicle body coordinate system. Then, the second calibration computation unit 65*d* outputs the coordinates of the positions of the antennas 21 and 22 as calibrated values of the antenna parameters Lbbx, Lbby, Lbbz, Lbdx, Lbdy, and Lbdz.

The working machine parameters computed by the first calibration computation unit 65*c*, the antenna parameters computed by the second calibration computation unit 65*d*, and the bucket information are saved in the storage unit 43 of the display controller 39 for use in the foregoing computation of the blade edge position.

In the calibration system 200 for the excavator 100, the coordinates of the blade edge of the bucket 8 at the plurality of positions measured by the external measurement device 62 are converted into the vehicle body coordinate system. Then, the calibrated values of the parameters are automatically computed by numerical analysis based on the coordinates of the blade edge of the bucket 8 at the plurality of positions converted into the vehicle body coordinate system. This makes it possible to reduce the number of parameters requiring actual measurement. In addition, there is no need to adjust the values of the parameters at calibration until an agreement is reached between the measured values and the computed values of the position coordinates of the blade edge of the bucket 8. Accordingly, it is possible to improve the accuracy of position detection of the blade edge and shorten calibration time in the calibration system 200 for the excavator 100.

Upon the calibration, the unit normal vector BH' vertical to the swing plane B' specified by the upper structure position information RI is not used as the second unit-normal vector as illustrated in FIG. 22 but the intersection vector DAB between the operation plane A of the working machine 2 and the swing plane B' of the upper structure 3 is first computed as illustrated in FIG. 23. Then, the unit normal vector BH of the plane B passing through the intersection vector DAB and vertical to the operation plane A of the working machine 2 is computed as the second unit-normal vector. This makes it possible to compute the vehicle body coordinate system with high accuracy even if the operation plane A of the working machine 2 and the swing plane B' of the upper structure 3 are not strictly vertical to each other. As a result, it is possible to further improve the accuracy of detecting the position of the blade edge of the bucket 8.

The corrected-working-machine-position information MIC includes the coordinates of the first position P1 to the fifth position P5 different in the vertical direction and the anteroposterior direction of the vehicle body of the working machine 2. Using the coordinates of the various positions makes it possible to compute the coordinate conversion information with high accuracy. Further, the corrected-working-machine-position information MIC is obtained by correcting the working machine position information MI measured by the external measurement device 62 taking into account the inclination of the excavator 100 in the anteroposterior direction of the vehicle body, and thus the information takes values closer to the original positions of the blade edge. This controls a deterioration of the accuracy of measuring the position of the blade edge in the height direction of the excavator 100, and thus controls a deterioration of the accuracy of the calibration. Accordingly, it is possible to control the deterioration of the accuracy of the calibrated values of the working machine parameters.

As in the foregoing, the embodiment is described but the embodiment is not limited by the foregoing description. In addition, the above-described constitutional elements include constitutional elements that can be readily conceived by those skilled in the art, constitutional elements virtually equal to the foregoing ones, and constitutional elements equivalent to the foregoing ones. Further, the foregoing constitutional elements can be combined as appropriate. Moreover, at least one of various omissions, replacements, and modifications of the constitutional elements can be performed without departing from the scope of the embodiment. For example, the working machine 2 has the boom 6, the arm 7, and the bucket 8, but a working tool attached to the working machine 2 is not limited to the bucket 8.

The blade edge of the bucket 8 is exemplified as a working point. However, if a working tool other than the bucket 8 is used, the working point may be a point in contact with a target subject such as a point at a tip end of the working tool. The rotation angles $\alpha$, $\beta$, and $\gamma$ of the boom 6, the arm 7, and the bucket 8 may be detected directly by angular sensors. The pitch angle $\theta p$ may be determined, for example, from results of detection by a level attached to the counter weight WT of the excavator 100 as an inclination information detection device. In addition, a pressure sensor may be provided to the boom 6 to determine moment of the working machine 2, and then determine inclination information in the anteroposterior direction of the vehicle body of the excavator 100, for example, the pitch angle $\theta p$, from the obtained moment.

The working machine position information MI is not limited to the coordinates of five positions of the blade edge of the bucket 8. For example, the working machine position information MI may include at least three positions of the working point different in posture of the working machine 2. In this case, the three positions of the working point may not be aligned in a straight line but one position of the working point may be separated from a straight line linking the two other working points in the up-and-down direction or the anteroposterior direction of the vehicle body.

The working machine position information MI, the upper structure position information RI, and the antenna position information AI may be input from the external measurement device 62 to the input unit 63 of the calibration device 60 by a wired or wireless communication means. The external measurement device 62 is not limited to a total station but may be any other device for measuring the position of the working point. In the embodiment, the unit normal vector BH, obtained by correcting the unit normal vector BH' vertical to the swing plane B' specified by the upper structure position information RI, is used as coordinate conversion information but the unit normal vector BH' may be used as coordinate conversion information instead.

REFERENCE SIGNS LIST

2 Working machine
3 Upper structure
5 Chassis
6 Boom
7 Arm
8 Bucket (working tool)
60 Calibration device
63 Input unit
62 External measurement device
65*a* Vehicle-body-coordinate-system computation unit
65*b* Coordinate conversion unit
65*c* First calibration computation unit
65*d* Second calibration computation unit
65*e* Correction unit
100 Excavator

The invention claimed is:

1. A calibration system for an excavator, comprising:
the excavator that includes a chassis, an upper structure that is swingably attached to the chassis, a working machine that includes a boom rotatably attached to the upper structure, an arm rotatably attached to the boom, and a working tool rotatably attached to the arm, and a current position computation processor that computes a current position of a working point included in the working tool, based on a plurality of parameters indicating dimensions of the boom, the arm, and the working tool, a rotation angle of the boom with respect to the upper structure, a rotation angle of the arm with respect to the boom, and a rotation angle of the working tool with respect to the arm;
a calibration device including a processor configured to calibrate the parameters;
an external position measurement device that measures a position of the working point; and
an inclination information detector to detect inclination information of the excavator in an anteroposterior direction of a vehicle body, wherein
the processor of the calibration device corrects a plurality of positions of the working point measured by the external position measurement device, based on the inclination information of the excavator in the anteroposterior direction of the vehicle body detected by the inclination information detector, and computes calibrated values of the parameters based on coordinates of the working point at the plurality of corrected positions.

2. The calibration system for an excavator according to claim 1, wherein the inclination information is a pitch angle of the excavator.

3. The calibration system for an excavator according to claim 1, wherein the processor of the calibration device corrects the plurality of positions of the working point according to the following equation:

$$\begin{pmatrix} x_c \\ z_c \end{pmatrix} = \begin{pmatrix} \cos\theta_p & -\sin\theta_p \\ \sin\theta_p & \cos\theta_p \end{pmatrix} \begin{pmatrix} X'_c - X_c0 \\ Z'_c - Z_c0 \end{pmatrix}$$

where:
(Xc', Zc') are coordinates of a position of a blade edge of a bucket of the excavator measured by the external position measurement device in earth's gravitational coordinate system X-Z,
(Xc, Zc) are the coordinates of the blade edge at an original position of the working machine in the coordinate system X-Z,
(Xc0, Zc0) are coordinates of a position CP which is an origin of the coordinate system X-Z, and
θp is a pitch angle reflecting rotation of a position of the blade edge in an upward direction around the position CP.

4. A calibration system for an excavator, comprising:
the excavator that includes a chassis, an upper structure that is swingably attached to the chassis, a working machine that includes a boom rotatably attached to the upper structure, an arm rotatably attached to the boom, and a working tool rotatably attached to the arm, an angle detection unit that detects a rotation angle of the boom with respect to the upper structure, a rotation angle of the arm with respect to the boom and a rotation angle of the working tool with respect to the arm, and a current position computation unit that computes a current position of a working point included in the working tool, based on a plurality of parameters indicating dimensions and the rotation angles of the boom, the arm, and the working tool;
a calibration device configured to calibrate the parameters;
an external measurement device that measures a position of the working point; and
an inclination information detection device that detects inclination information of the excavator in an anteroposterior direction of a vehicle body, wherein
the calibration device includes:
an input unit into which working machine position information including at least three positions of the working point different in posture of the working machine measured by the external measurement device, upper structure position information including at least three positions of the working point different in swing angle of the upper structure with respect to the chassis, and inclination information of the excavator in the anteroposterior direction of the vehicle body corresponding to the positions of the working point included in the working machine position information, detected by the inclination information detection device, are input;
a correction unit that corrects the positions of the working point included in the working machine position information based on the inclination information;
a vehicle-body-coordinate-system computation unit that computes a first unit-normal vector vertical to an operation plane of the working machine based on the working machine position information including the corrected positions of the working point, computes a second unit-normal vector vertical to a swing plane of the upper structure based on the upper structure position information, and computes a third unit-normal vector vertical to the first unit-normal vector and the second unit-normal vector;
a coordinate conversion unit that converts coordinates of the working point at the plurality of positions measured by the external measurement device, from a coordinate system at the external measurement device to a vehicle body coordinate system at the excavator, using the first unit-normal vector, the second unit-normal vector, and the third unit-normal vector; and
a calibration computation unit that computes calibrated values of the parameters based on the coordinates of the working point at the plurality of positions converted into the vehicle body coordinate system.

5. The calibration system for an excavator according to claim 4, wherein the inclination information is a pitch angle of the excavator.

6. A computer-implemented calibration method for an excavator that includes a chassis, an upper structure that is swingably attached to the chassis, and a working machine that includes a boom rotatably attached to the upper structure, an arm rotatably attached to the boom, and a working tool rotatably attached to the arm, the method being for calibrating a plurality of parameters indicating dimensions and rotation angles of the boom, the arm, and the working tool, the plurality of parameters being stored in a memory on the excavator and used for position detection of the working tool when operating the excavator, the method comprising:

acquiring from an inclination information detection device inclination information of the excavator in an anteroposterior direction of a vehicle body;

correcting via a calibration device a plurality of positions of a working point included in the working tool based on the inclination information, the plurality of positions of a working point being measured by an external position measurement device;

computing via the calibration device calibrated values of the parameters based on coordinates of the working point at the plurality of corrected positions; and using the plurality of parameters for position detection of the working tool when operating the excavator.

7. The computer-implemented calibration method according to claim 6, further comprising:

acquiring via an input unit working machine position information including at least two positions of the working point different in posture of the working machine and a position of a predetermined reference point on an operation plane of the working machine or including at least three positions of the working point included in the working tool, different in posture of the working machine, upper structure position information including at least three positions of the working point different in swing angle of the upper structure with respect to the chassis, and inclination information of the excavator in an anteroposterior direction of a vehicle body corresponding to the positions of the working point included in the working machine position information;

computing via a vehicle-body-coordinate-system computation unit of the calibration device a first unit-normal vector vertical to the operation plane of the working machine based on the working machine position information including the corrected positions of the working point, computing a second unit-normal vector vertical to a swing plane of the upper structure based on the upper structure position information, and computing a third unit-normal vector vertical to the first unit-normal vector and the second unit-normal vector; and converting via a coordinate conversion unit of the calibration device coordinates of the working point at the plurality of positions, from a coordinate system at the external measurement device to a vehicle body coordinate system at the excavator, using the first unit-normal vector, the second unit-normal vector, and the third unit-normal vector, wherein a correction unit of the calibration device corrects the positions of the working point included in the working machine position information based on the inclination information, and wherein a calibration computation unit of the calibration device computes calibrated values of the parameters based on the coordinates of the working point at the plurality of positions converted into the vehicle body coordinate system.

* * * * *